(12) United States Patent
Guilloux

(10) Patent No.: US 10,545,355 B2
(45) Date of Patent: Jan. 28, 2020

(54) SPECTACLE OPHTHALMIC LENS, METHOD FOR DETERMINING A SPECTACLE OPHTHALMIC LENS

(71) Applicant: Essilor International, Charenton le Pont (FR)

(72) Inventor: Cyril Guilloux, Charenton le Pont (FR)

(73) Assignee: Essilor International, Charenton le Pont (FR)

( * ) Notice: Subject to any disclaimer, the term of this patent is extended or adjusted under 35 U.S.C. 154(b) by 353 days.

(21) Appl. No.: 15/512,874

(22) PCT Filed: Sep. 24, 2015

(86) PCT No.: PCT/EP2015/072024
§ 371 (c)(1),
(2) Date: Mar. 21, 2017

(87) PCT Pub. No.: WO2016/050613
PCT Pub. Date: Apr. 7, 2016

(65) Prior Publication Data
US 2017/0293160 A1    Oct. 12, 2017

(30) Foreign Application Priority Data
Sep. 30, 2014    (EP) .................................... 14306544

(51) Int. Cl.
*G02C 7/06* (2006.01)
*G02C 7/02* (2006.01)

(52) U.S. Cl.
CPC ............ *G02C 7/068* (2013.01); *G02C 7/027* (2013.01)

(58) Field of Classification Search
CPC .......... G02C 7/02; G02C 7/028; G02C 7/101; G02C 7/04; G02C 7/061; G02C 7/083; G02C 2202/20; G02C 2202/18; G02C 7/027; G02C 2202/16; G02C 2202/22; G02C 7/12; G02C 7/022; G02C 7/024; G02C 7/044; G02C 7/102; G02C 7/041;
(Continued)

(56) References Cited

U.S. PATENT DOCUMENTS 6,318,859 B1    11/2001  Baudart et al.
2006/0146280 A1  7/2006  Gupta et al.

FOREIGN PATENT DOCUMENTS

EP    2 045 649 A1    4/2009
JP    2013-510331 A    3/2013
(Continued)

OTHER PUBLICATIONS

International Search Report dated Oct. 19, 2015, in PCT/EP2015/072024, filed Sep. 24, 2015.
(Continued)

*Primary Examiner* — Collin X Beatty
*Assistant Examiner* — Grant A Gagnon
(74) *Attorney, Agent, or Firm* — Oblon, McClelland, Maier & Neustadt, L.L.P.

(57) ABSTRACT

A spectacle ophthalmic lens having a front surface and a back surface, the spectacle ophthalmic lens including a nasal lateral zone and a temporal lateral zone, wherein the front surface includes a progressive or regressive front surface which provides at least a magnifying function in the nasal and/or the temporal lateral zone of the lens, and wherein the back surface substantially compensates dioptric effects of the magnifying function of the progressive or regressive front surface.

16 Claims, 20 Drawing Sheets

(58) Field of Classification Search
CPC .......... G02C 7/06; G02C 13/005; G02C 1/02; G02C 7/042; G02C 7/068; G02C 7/088; G02C 13/001; G02C 13/003; G02C 1/023; G02C 1/10; G02C 2202/10; G02C 2202/24; G02C 5/00; G02C 7/025; G02C 7/047; G02C 7/049; G02C 7/063; G02C 7/066; G02C 7/085; G02C 7/086; G02C 7/10; G02C 7/104; G02C 7/105; G02C 11/02; G02C 11/12; G02C 1/00; G02C 1/04; G02C 1/06; G02C 1/08; G02C 2200/02; G02C 2200/08; G02C 2202/02; G02C 2202/04; G02C 2202/08; G02C 2202/12; G02C 5/02; G02C 7/046; G02C 7/048; G02C 7/08; G02C 7/108; G02C 7/14; G02C 7/16; G02B 1/041; G02B 1/105; G02B 1/14; G02B 1/18; G02B 27/0006; G02B 1/115; G02B 27/0172; G02B 3/12; G02B 1/16; G02B 2027/011; G02B 2027/0178; G02B 27/0075; G02B 27/4211; G02B 3/02; G02B 3/04; G02B 3/08; G02B 3/14; G02B 5/208; G02B 13/146; G02B 17/08; G02B 1/06; G02B 1/10; G02B 1/11; G02B 1/113; G02B 1/116; G02B 1/12; G02B 2027/0123; G02B 25/001; G02B 25/004; G02B 26/004; G02B 26/06; G02B 27/0018; G02B 27/0025; G02B 27/0037; G02B 27/2228; G02B 3/00; G02B 3/0062; G02B 3/0081; G02B 3/0087; G02B 5/00; G02B 5/1866; G02B 5/1876; G02B 5/188; G02B 5/1885; G02B 5/1895; G02B 5/286; G02B 5/3025; G02B 5/3033; G02B 6/10
USPC ......................................................... 351/159
See application file for complete search history.

(56) References Cited

FOREIGN PATENT DOCUMENTS

| | | |
|---|---|---|
| JP | 2014-139680 A | 7/2014 |
| WO | WO 2011/054058 A1 | 5/2011 |
| WO | 2014/102390 A1 | 7/2014 |

OTHER PUBLICATIONS

Office Action dated Jul. 8, 2019 in Japanese Patent Application No. 2017-512368, 16 pages (with English translation).

SPECTACLE OPHTHALMIC LENS, METHOD FOR DETERMINING A SPECTACLE OPHTHALMIC LENS

FIELD OF THE INVENTION

The invention relates to spectacle ophthalmic lenses and to a method for determining a spectacle ophthalmic lens.

BACKGROUND OF THE INVENTION

A wearer may be prescribed a positive or negative optical power correction. For presbyopic wearers, the value of the power correction is different for far-vision and near-vision, due to the difficulties of accommodation in near-vision. Ophthalmic lenses suitable for presbyopic wearers are multifocal lenses, the most suitable being usually progressive multifocal lenses.

SUMMARY OF THE INVENTION

The inventors have noticed that wearers may be not fully satisfied by known spectacle ophthalmic lenses.

They have noticed that wearers may be sensitive distortions and may obtain an enhanced visual comfort when providing them a magnifying function; they have further noticed that visual comfort may be significantly enhanced when a magnifying function is provided in the nasal and/or the temporal lateral zone of the lens.

The present invention provides a spectacle ophthalmic lens, suitable for correcting the vision of a wearer according to a wearer's prescription, having a front surface and a back surface, wherein the back surface is positioned on the side of the lens closest to a wearer's eye and the front surface is positioned on the opposite side of the lens when the spectacle ophthalmic lens is worn by the wearer, the spectacle ophthalmic lens comprising a nasal lateral zone and a temporal lateral zone, wherein the front surface comprises a progressive or regressive front surface which provides at least a magnifying function in the nasal and/or the temporal lateral zone of the lens, and wherein the back surface substantially compensates dioptric effects of the magnifying function of the progressive or regressive front surface.

Thanks to the teaching of the present invention, one can provide to a wearer a spectacle ophthalmic lens where local magnification(s) and/or distortion(s) are managed according to the wearer's needs without modifying the optical function of the lens.

Thus, improved comfort may be further provided for a wearer.

According to different embodiments, that may be combined according to all technically possible embodiments, the spectacle ophthalmic lens of the invention may comprise following additional features:

the spectacle ophthalmic lens is chosen within the list consisting of a single vision lens and a progressive multifocal lens and wherein the magnifying function dioptric effects results from following features when the spectacle ophthalmic lens is worn in standard wearing conditions:

If the spectacle ophthalmic lens is a single vision lens:
  the spectacle ophthalmic lens has a fitting point and is associated with data suitable for defining a top to bottom axis ($\beta=0$) of the spectacle ophthalmic lens,
  the dioptric power variation over the whole lens is equal or less than 0.5 Diopter, as for example equal or less than 0.25 Diopter,
  the progressive or regressive front surface comprises at least a curvature extreme value located in the nasal/or the temporal zone of the lens;

If the spectacle ophthalmic lens is a progressive multifocal lens:
  the spectacle ophthalmic lens has a fitting point and is associated with data suitable for defining a top to bottom axis ($\beta=0$) of the spectacle ophthalmic lens,
  the spectacle ophthalmic lens has a meridian line $(\alpha_m, \beta_m)$,
  optical power extremes are located in a gaze direction zone comprised between $(\alpha_m, \beta_m-10°)$ and $(\alpha_m, \beta_m+10°)$,
  the progressive or regressive front surface comprises at least a curvature extreme value located in the nasal/or the temporal zone of the lens.

the spectacle ophthalmic lens has a main line of sight defining a front meridian line on the progressive or regressive front surface, and where the front meridian line has a minimum value of curvature $C_{1mermin}$ and a maximum value of curvature $C_{1mermax}$ and, the progressive or regressive front surface comprises a first point $P_{11}$ having a minimum value of curvature $C_{11min}$ and a maximum value of curvature $C_{11max}$ where $C_{11max} > C_{1mermax}$ or $C_{11min} < C_{1mermin}$ and wherein the distance between $P_{11}$ and the front meridian line is greater than 5 mm.

the progressive or regressive front surface fulfills the requirements of one of the conditions of following list consisting of:
  Condition 1: the progressive or regressive front surface comprises a second point $P_{12}$, different from point $P_{11}$, having a minimum value of curvature $C_{12min}$ and a maximum value of curvature $C_{12max}$ where $C_{12max} > C_{1mermax}$ or $C_{12min} < C_{1mermin}$) and wherein the distance between $P_{12}$ and the front meridian line is greater than 5 mm;
  Condition 2: the front surface is a progressive surface and $C_{11max} > C_{1mermax}$;
  Condition 3: the front surface is a regressive surface and $C_{11min} < C_{1mermin}$.

the progressive or regressive front surface comprises a second point $P_{12}$ having a minimum value of curvature $C_{12min}$ and a maximum value of curvature $C_{12max}$, where $C_{12max} > C_{1mermax}$ or $C_{12min} < C_{1mermin}$, where the distance between $P_{12}$ and the front meridian line is greater than 5 mm and where both points $P_{11}$ and $P_{12}$ are located either in the nasal lateral zone or in the lateral zone.

the main line of sight defines a back meridian line on the back main surface, wherein the back meridian line has a minimum value of curvature $C_{2mermin}$ and a maximum value of curvature $C_{2mermax}$ and, where the back main surface comprises a third point $P_{23}$ having a minimum value of curvature $C_{23min}$ and a maximum value of curvature $C_{23max}$ where $C_{23max} > C_{2mermax}$ or $C_{23min} < C_{2mermin}$, and where the distance between $P_{23}$ and the back meridian line is greater than 5 mm.

$(n-1) \times |C_{11max} - C_{1mermax}| \geq 0.25$ Diopter or $(n-1) \times |C_{11min} - C_{1mermin}| \geq 0.25$ Diopter, where n in the refractive index of the lens.

$(n-1) \times (C_{1mermax} - C_{1mermin}) \geq 0.25$ Diopter, preferably $\geq 0.5$ Diopter, where n in the refractive index of the lens.

the spectacle ophthalmic lens is a progressive multifocal lens which comprises when worn an intermediate region and a line of sight passing through the first vision region and the intermediate region, the line of sight splitting the lens into a nasal lateral zone and a temporal lateral zone and wherein the first vision region comprises a zone of stabilized optical power.

the spectacle ophthalmic lens further comprises a second vision region comprising a zone of stabilized optical power and wherein the intermediate region joins the first vision region and the second vision region.

the spectacle ophthalmic lens having a main line of sight, the main line of sight defining a front meridian line on the front surface and a back meridian line on the back surface wherein, the front surface is asymmetrical regarding the front meridian line and the back surface is asymetrical regarding the back meridian line and wherein the dioptric function is symmetrical regarding the main line of sight.

following features:
  each couple of point located on the first main surface at a given height and equidistant from the meridian line satisfies MAX($|SPH_N-SPH_T|$)≥0.25 Diopter, as for example equal or greater to 0.5 Diopter,
  each couple of gaze direction equidistant from the main line of sight and located at a same elevation, satisfies MAX($|Popt_N-Popt_T|$)≤k.MAX($|SPH_N-SPH_T|$), where k≤0.8, as for example k is equal or less than to 0.5, and wherein SPH is the mean sphere value in a zone, Popt is the optical power value in a zone, index N relates to the nasal lateral zone and index T relates to the temporal lateral zone, MAX( ) is the maximum value of the quantity evaluated over an evaluation domain.

In another aspect, the present invention also provides a method for determining a spectacle ophthalmic lens according to any of preceding spectacle ophthalmic lens comprising the steps of:
  a) Providing a magnifying function;
  b) Providing an initial spectacle lens;
  c) Determining a dioptric function of the initial spectacle lens;
  d) Defining a target lens having the dioptric function of the initial spectacle lens and a target magnifying function equal to the magnifying function of step a);
  e) Determining a final spectacle ophthalmic lens by optimization using the targets of step d) as targets for the optimization.

According to an embodiment of said method for determining a spectacle ophthalmic lens, the magnifying function provided by the first refractive surface is individually optimized based on wearer parameter.

In still another aspect, the present invention also provides an ophthalmic spectacle lens supply system for providing a spectacle ophthalmic lens comprising:
  a first computing unit (CU1) suitable for placing an order of a spectacle ophthalmic lens, wherein said first computing unit (CU1) is located at a lens ordering side (LOS) and comprise a first outputting interface (OI1) suitable for outputting order data (OD) and wherein the order data (OD) comprise an individual magnifying need;
  a second computing unit (CU2) suitable for providing lens data (LD) based upon order data (OD), wherein said second computing unit (CU2) is located at a lens determination side (LDS) and comprise:
    a determining computing unit (DCU) suitable for determining a spectacle ophthalmic lens according to the preceding method for determining a spectacle ophthalmic lens so as to fulfill the individual magnifying need,
    a second outputting interface (OI2) suitable for outputting said lens data (LD), wherein said lens data (LD) comprise at least lens blank data and surface data;
    a first transmission computing unit (TCU1) suitable for transmitting said order data (OD) from said first computing unit (CU1) to said second computing unit (CU2);
    a manufacturing device (MD) suitable for manufacturing the spectacle ophthalmic lens based on the lens data (LD) wherein said manufacturing device (MM) is located at a lens manufacturing side (LMS);
    a second transmission computing unit (TCU2) suitable for transmitting said lens data (LD) from said second computing unit (CU2) to said manufacturing device (MD).

Further features and advantages of the invention will appear from the following description of embodiments of the invention, given as non-limiting examples, with reference to the accompanying drawings listed hereunder.

It can be appreciated that elements in the figures are illustrated for simplicity and clarity and have not necessarily been drawn to scale.

Definitions

Following definitions are provided in the frame of the present invention:
  The wordings "wearer's prescription", also called "prescription data", are known in the art. Prescription data refers to one or more data obtained for the wearer and indicating for at least an eye, preferably for each eye, a prescribed sphere $SPH_p$, and/or a prescribed astigmatism value $CYL_p$ and a prescribed axis $AXIS_p$ suitable for correcting the ametropia of each eye for the wearer and, if suitable, a prescribed addition $Add_p$ suitable for correcting the presbyopia of each of his eye. The prescription data are usually determined for a wearer when looking in far vision conditions; accordingly $SPH_{p\_FV}$, $CYL_{p\_FV}$, $AXIS_{p\_FV}$ $Add_{p\_FV}$ are determined where the index "FV" means "far vision".
  The prescription data may also be determined in other conditions; for example the prescription data may also be determined for a wearer when looking in near vision conditions; accordingly $SPH_{p\_NV}$, $CYL_{p\_NV}$, $AXIS_{p\_NV}$, $Add_{p\_NV}$ are determined. The sphere for each eye for near (proximate) vision is obtained by summing the prescribed addition $Add_p$ to the far vision prescribed sphere $SPH_{p\_FV}$ prescribed for the same eye: $SPH_{p\_NV}=SPH_{p\_FV}+Add_p$, where the index "NV"

means "near vision". In the case of a prescription for progressive lenses, prescription data comprise wearer data indicating at least an eye, preferably for each eye, values for $SPH_{FV}$, $CYL_{FV}$ and $Add_p$.

"Spectacle ophthalmic lenses" are known in the art. According to the invention, the spectacle ophthalmic lens may be selected from single vision lens (also called monofocal or unifocal lens), multifocal lens such as for example a bifocal lens, a trifocal lens, a progressive or a degressive (mid-distance) lens. The lens may also be a lens for information glasses, wherein the lens comprises means for displaying information in front of the eye. The lens may also be suitable for sunglasses or not. Preferred lenses according to the invention are single vision lenses or progressive multifocal ophthalmic lenses. All ophthalmic lenses of the invention may be paired so as to form a pair of lenses (left eye LE, right eye RE).

Figure 1:
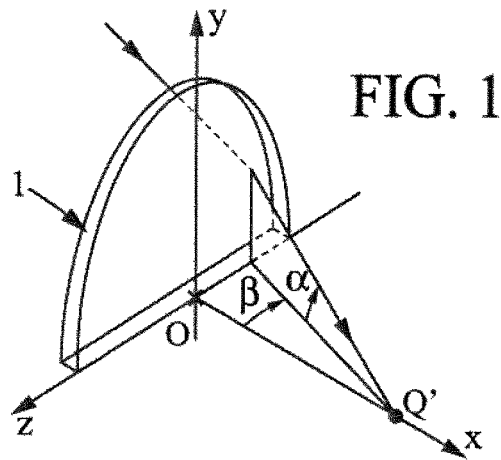
FIGS. 1 to 3 show, diagrammatically, optical systems of eye and lens and ray tracing from the center of rotation of the eye.
Figure 2:
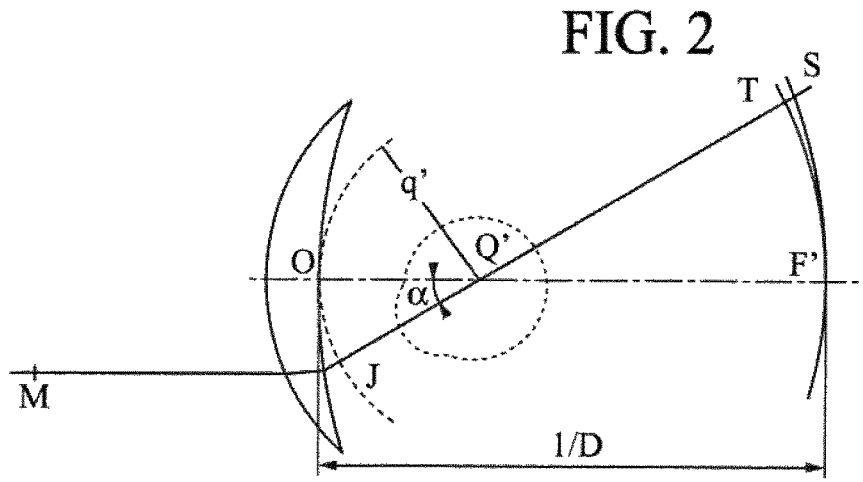

A "gaze direction" can be identified by a couple of angle values $(\alpha,\beta)$, wherein said angles values are measured with regard to reference axes centered on the center of rotation of the eye. More precisely, FIG. 1 represents a perspective view of such a system illustrating parameters $\alpha$ and $\beta$ used to define a gaze direction. FIG. 2 is a view in the vertical plane parallel to the antero-posterior axis of the wearer's head and passing through the center of rotation of the eye in the case when the parameter $\beta$ is equal to 0. The center of rotation of the eye is labeled Q'. The axis Q'F', shown on FIG. 2 in a dot-dash line, is the horizontal axis passing through the center of rotation of the eye and extending in front of the wearer—that is the axis Q'F' corresponding to the primary gaze direction. This axis cuts the front surface of the lens on a point called the fitting point, which is present on lenses to enable the positioning of lenses in a frame by an optician. The fitting point corresponds to a lowering angle $\alpha$ of 0° and an azimuth angle $\beta$ of 0°. The point of intersection of the rear surface of the lens and the axis Q'F' is the point O. O can be the fitting point if it is located on the rear surface. A vertex sphere, of center Q', and of radius q', which is intercepting the rear surface of the lens in a point of the horizontal axis. As examples, a value of radius q' of 25.5 mm corresponds to a usual value and provides satisfying results when wearing the lenses.

A given gaze direction—represented by a solid line on FIG. 1—corresponds to a position of the eye in rotation around Q' and to a point J (see FIG. 2) of the vertex sphere; the angle $\beta$ is the angle formed between the axis Q'F' and the projection of the straight line Q'J on the horizontal plane comprising the axis Q'F'; this angle appears on the scheme on FIG. 1. The angle $\alpha$ is the angle formed between the axis Q'J and the projection of the straight line Q'J on the horizontal plane comprising the axis Q'F'; this angle appears on the scheme on FIGS. 1 and 2. A given gaze view thus corresponds to a point J of the vertex sphere or to a couple $(\alpha, \beta)$. The more the value of the lowering gaze angle is positive, the more the gaze is lowering and the more the value is negative, the more the gaze is rising. In a given gaze direction, the image of a point M in the object space, located at a given object distance, is formed between two points S and T corresponding to minimum and maximum distances JS and JT, which would be the sagittal and tangential local focal lengths. The image of a point in the object space at infinity is formed, at the point F'. The distance D corresponds to the rear frontal plane of the lens.

For each gaze direction $(\alpha,\beta)$, a mean refractive power $Popt(\alpha,\beta)$, a module of astigmatism $Ast(\alpha,\beta)$ and an axis $Ax(\alpha,\beta)$ of this astigmatism, and a module of resulting (also called residual or unwanted) astigmatism $Asr(\alpha,\beta)$ are defined.

"Ergorama" is a function associating to each gaze direction the usual distance of an object point. Typically, in far vision following the primary gaze direction, the object point is at infinity. In near vision, following a gaze direction essentially corresponding to an angle $\alpha$ of the order of 35° and to an angle $\beta$ of the order of 5° in absolute value towards the nasal side, the object distance is of the order of 30 to 50 cm. For more details concerning a possible definition of an ergorama, US patent U.S. Pat. No. 6,318,859 may be considered. This document describes an ergorama, its definition and its modeling method. For a method of the invention, points may be at infinity or not. Ergorama may be a function of the wearer's ametropia.

Using these elements, it is possible to define a wearer optical power and astigmatism, in each gaze direction. An object point M at an object distance given by the ergorama is considered for a gaze direction $(\alpha,\beta)$. An object proximity ProxO is defined for the point M on the corresponding light ray in the object space as the inverse of the distance MJ between point M and point J of the vertex sphere:

$ProxO=1/MJ$

This enables to calculate the object proximity within a thin lens approximation for all points of the vertex sphere, which is used for the determination of the ergorama. For a real lens, the object proximity can be considered as the inverse of the distance between the object point and the front surface of the lens, on the corresponding light ray.

For the same gaze direction $(\alpha,\beta)$, the image of a point M having a given object proximity is formed between two points S and T which correspond respectively to minimal and maximal focal distances (which would be sagittal and tangential focal distances). The quantity ProxI is called image proximity of the point M:

$$ProxI = \frac{1}{2}\left(\frac{1}{JT} + \frac{1}{JS}\right)$$

The optical power is also called refractive power

By analogy with the case of a thin lens, it can therefore be defined, for a given gaze direction and for a given object proximity, i.e. for a point of the object space on the corresponding light ray, an optical power Popt as the sum of the image proximity and the object proximity.

$Popt=ProxO+ProxI$

With the same notations, an astigmatism Ast is defined for every gaze direction and for a given object proximity as:

$$Ast = \left|\frac{1}{JT} - \frac{1}{JS}\right|$$

Figure 3:
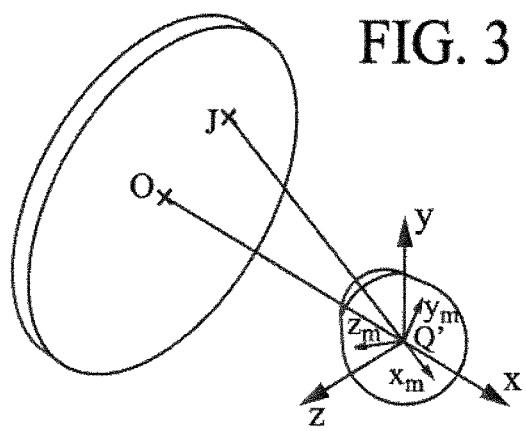

This definition corresponds to the astigmatism of a ray beam created by the lens. FIG. 3 represents a perspective view of a configuration wherein the parameters α and β are non-zero. The effect of rotation of the eye can thus be illustrated by showing a fixed frame {x, y, z} and a frame {$x_m$, $y_m$, $z_m$} linked to the eye. Frame {x, y, z} has its origin at the point Q'. The axis x is the axis Q'O and it is orientated from the lens towards the eye. The y axis is vertical and orientated upwardly. The z axis is such that the frame {x, y, z} is orthonormal and direct. The frame {$x_m$, $y_m$, $z_m$} is linked to the eye and its center is the point Q'. The $x_m$ axis corresponds to the gaze direction JQ'. Thus, for a primary gaze direction, the two frames {x, y, z} and {$x_m$, $y_m$, $z_m$} are the same. It is known that the properties for a lens may be expressed in several different ways and notably in surface and optically.

When referring to geometrical properties of a lens, one defines a "front surface" and a "back surface" of said lens, where the back surface is positioned on the side of the lens closest to a wearer's eye and the front surface is positioned on the opposite side of the lens when the spectacle ophthalmic lens is worn by the wearer. The front surface and the back surface geometrical characterizations, the relative geometrical spatial position of the front surface and the back surface, the refractive index of the material between said two surfaces, an ergorama and wearing conditions are data that permit calculating optical features of the lens for said given ergorama and wearing conditions.

Figure 4:
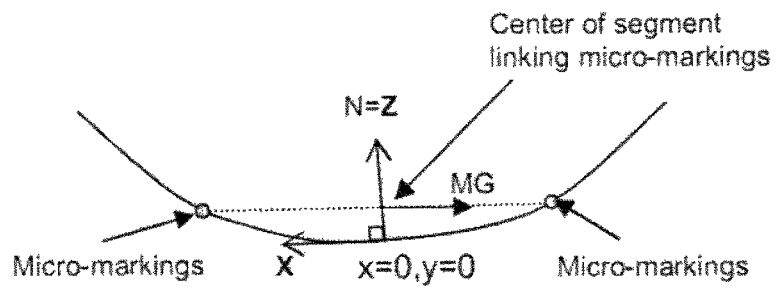
FIGS. 4 and 5 show referentials defined with respect to micro-markings, for a surface bearing micro-markings and for a surface not bearing the micro-markings respectively.
Figure 5:
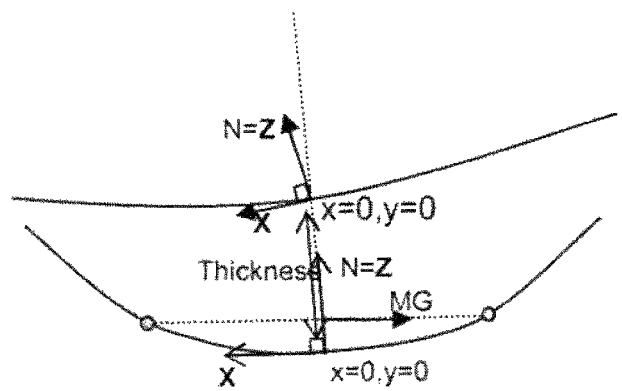

Accordingly, in the case of an ophthalmic lens, the characterization may be of a surface or optical kind. Whenever the characterization of the lens is of optical kind, it refers to the ergorama-eye-lens system described above. For simplicity, the term 'lens' is used in the description but it has to be understood as the 'ergorama-eye-lens system'. The value in surface terms can be expressed with relation to points. The points are located with the help of abscissa or ordinate in a frame as defined above with respect to FIGS. 4 and 5. The referential (x,y,z) of said figures is a direct orthonormal referential.

The values in optic terms can be expressed for gaze directions. Gaze directions are usually given by their degree of lowering and azimuth in a frame whose origin is the center of rotation of the eye. When the lens is mounted in front of the eye, a point called the fitting point (referred as FP) is placed before the pupil or before the eye rotation center Q' of the eye for a primary gaze direction. The primary gaze direction corresponds to the situation where a wearer is looking straight ahead. In the chosen frame, the fitting point corresponds thus to a lowering angle α of 0° and an azimuth angle β of 0° whatever surface of the lens the fitting point is positioned—rear surface or front surface.

In the remainder of the description, terms like «up», «bottom», «horizontal», «vertical», «above», «below», or other words indicating relative position may be used. These terms are to be understood in the wearing conditions of the lens.

Notably, the "upper" part of the lens corresponds to a negative lowering angle α <0° and the "lower" part of the lens corresponds to a positive lowering angle α>0°. Similarly, the "upper" part of the surface of a lens—or of a semi-finished lens blank—corresponds to a positive value along the y axis, and preferably to a value along the y axis superior to the y value corresponding to the fitting point and the "lower" part of the surface of a lens corresponds to a negative value along the y axis in the frame as defined above with respect to FIGS. 4 and 5, and preferably to a value along the y axis inferior to the y_value at the fitting point.

A "top to bottom axis" is thus defined far a varying from a maximum positive value to a most negative value when β is equal to nil. When considering the front surface and the back surface of the lens, "top to bottom axis" corresponds to the y axis.

The "meridian line" ($α_m$, $β_m$) of a progressive lens may a line defined from top to bottom of the lens and passing through the fitting point: for each lowering of the view of an angle α=$α_m$ between the gaze direction corresponding to the fitting point and the bottom of the lens, the gaze direction ($α_m$, $β_m$) is searched by ray tracing, in order to be able to see clearly the object point located in the median plane, at the distance determined by the ergorama. For each raising of the view of an angle α=$α_m$ between the gaze direction corresponding to the fitting point and the top of the lens, ($α_m$, $β_m$)=($α_m$,0). The median plane is the median plane of the head, preferentially passing through the base of the nose. This plane may also be passing through the middle of right and left eye rotation centers.

Thus, all the gaze directions defined in that way form the meridian line of the ergorama-eye-lens system. For personalization purpose, postural data of the wearer, such as angle and position of the head in the environment, might be taken into account to determine the object position. For instance, the object position might be positioned out of median plane to model a wearer lateral shift in near vision.

The meridian line of the lens represents the locus of mean gaze directions of a wearer when he is looking from far to near visions.

The meridian line is usually contained in a vertical plane above the fitting point, and deflected towards the nasal side below the fitting point.

The "meridian line" of a single vision (monofocal) lens is defined as the vertical straight line passing through the optical center, OC, of the lens, where the "optical center" is the intersection of the optical axis, OA, with the front surface of a lens; the optical center, OC, thus corresponds to ($α_{OC}$, $β_{OC}$)=(0,0).

The "surface meridian line" 32 of a lens surface is defined as follow: each gaze direction ($α_m$, $β_m$) belonging to the meridian line of the lens intersects in wearing conditions the surface in a point ($x_m$, $y_m$) according to ray tracing. The surface meridian line is the set of points corresponding to the gaze directions of the meridian line of the lens.

Figure 7:
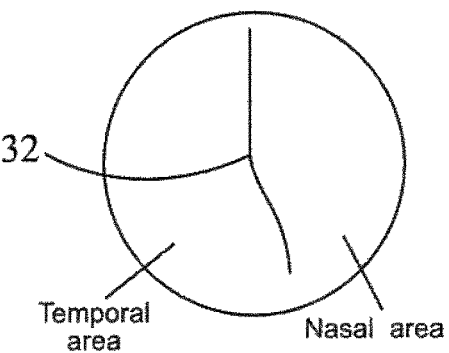

As shown in FIG. 7, the surface meridian line 32, belonging for example to the front surface of the lens, separates the lens in a "nasal area" (N) and a "temporal area" (T). As expected, the nasal area is the area of the lens which is between the meridian and the nose of the wearer whereas the temporal area is the area which is between the meridian and the temple of the wearer.

The "central zone" of a lens is defined as the zone delimited on either side of the meridian line by gaze directions whose azimuth angle is equal to $β_m$±10°. Accordingly, the central optical zone comprising the meridian line ($α_m$, $β_m$).

The "lateral nasal" and "lateral temporal zones" of the lens are defined with respect to the "central zone" of a lens. The nasal (respectively temporal) zone corresponds to the set of gaze directions out of the central zone and situated on the nasal area (N) (respectively on the temporal area (T)).

According to an embodiment, the central zone, the lateral nasal zone and the lateral temporal zone are inside a zone centered on to the gaze direction corresponding to gaze directions passing through the prism reference point PRP (see below) and containing all gaze directions ($\alpha$, $\beta$) respecting the following inequality:

$$(|\alpha|^2+|\beta|^2)^{1/2} \leq 50°.$$

Figure 6:
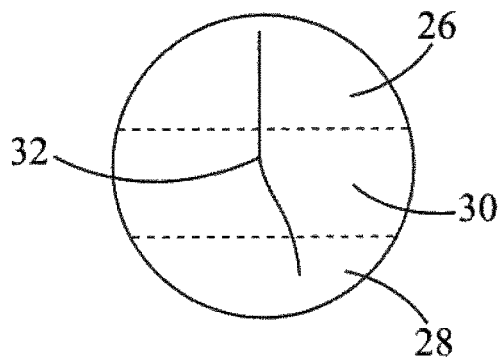
FIGS. 6 and 7 show field vision zones of a lens.

The "visual field zones" seen through a progressive lens are known to the skilled person and are schematically illustrated in FIGS. 6 and 7. The lens comprises a far vision (distant vision) zone 26 located in the upper part of the lens, a near vision zone 28 located in the lower part of the lens and an intermediate zone 30 situated between the far vision zone 26 and the near vision zone 28. The lens also has a surface meridian line 32 belonging for example to the front surface and passing through the three zones and defining a nasal side and a temporal side.

A "far-vision gaze direction" is defined for a lens, as the vision gaze direction corresponding to the far vision (distant) reference point, referred as FVP, and thus ($\alpha_{FV}$, $\beta_{FV}$), where the refractive power is substantially equal to the prescribed power in far vision. It may also be defined as the gaze direction corresponding to the fitting point, FP, in which case $\alpha=\beta=0°$. Within the present disclosure, far-vision is also referred to as distant-vision.

"Astigmatism" refers to astigmatism generated by the lens, or to residual astigmatism (resulting astigmatism) which corresponds to the difference between the prescribed astigmatism (wearer astigmatism) and the lens-generated astigmatism; in each case, with regards to amplitude or both amplitude and axis;

"Magnification" is defined as the ratio between the apparent angular size (or the solid angle) of an object seen without lens and the apparent angular size (or the solid angle) of an object seen through the lens;

A "magnifying function" is an optical arrangement of a surface of a lens that permits managing locally the magnification; in other words, a magnifying function is the contribution of a surface to the magnification; accordingly, said magnifying function only relates to geometrical features of the said surface, and not to lens features, such as the lens thickness and/or the lens optical power.

A "minimum curvature" $CURV_{min}$ is defined at any point on an aspherical surface by the formula:

$$CURV_{min} = \frac{1}{R_{max}}$$

where $R_{max}$ is the local maximum radius of curvature, expressed in meters and $CURV_{min}$ is expressed in m$^{-1}$.

A "maximum curvature" $CURV_{max}$ can be defined at any point on an aspheric surface by the formula:

$$CURV_{max} = \frac{1}{R_{min}}$$

where $R_{min}$ is the local minimum radius of curvature, expressed in meters and $CURV_{max}$ is expressed in m$^{-1}$.

"Minimum and maximum spheres" labeled $SPH_{min}$ and $SPH_{max}$ can be deduced according to the kind of surface considered.

When the surface considered is the object side surface (front surface), the expressions are the following:

$$SPH_{min} = (n-1)*CURV_{min} = \frac{n-1}{R_{max}} \text{ and } SPH_{max} = (n-1)*CURV_{max} = \frac{n-1}{R_{min}}$$

where n is the refractive index of the constituent material of the lens.

If the surface considered is an eyeball side surface (rear surface), the expressions are the following:

$$SPH_{min} = (1-n)*CURV_{min} = \frac{1-n}{R_{max}} \text{ and } SPH_{max} = (1-n)*CURV_{max} = \frac{1-n}{R_{min}}$$

where n is the refractive index of the constituent material of the lens.

A "mean sphere" $SPH_{mean}$ at any point on an aspherical surface can also be defined by the formula:

$$SPH_{mean} = \frac{1}{2}(SPH_{min} + SPH_{max})$$

The expression of the mean sphere therefore depends on the surface considered:

if the surface is the object side surface, $$SPH_{mean} = \frac{n-1}{2}\left(\frac{1}{R_{min}} + \frac{1}{R_{max}}\right)$$

if the surface is an eyeball side surface, $$SPH_{mean} = \frac{1-n}{2}\left(\frac{1}{R_{min}} + \frac{1}{R_{max}}\right)$$

A cylinder CYL is also defined by the formula $CYL=|SPH_{max}-SPH_{min}|$.

A "cylinder axis" $\gamma_{AX}$ is the angle of the orientation of the maximum curvature $CURV_{max}$ with relation to a reference axis and in the chosen direction of rotation. In the TABO convention, the reference axis is horizontal (the angle of this reference axis is 0°) and the direction of rotation is counterclockwise for each eye, when looking to the wearer)(0°$\leq \gamma_{AX} \leq$180°. An axis value for the cylinder axis $\gamma_{AX}$ of +45° therefore represents an axis oriented obliquely, which when looking to the wearer, extends from the quadrant located up on the right to the quadrant located down on the left.

The characteristics of any aspherical face of the lens may be expressed by means of the local mean spheres and cylinders.

A surface may thus be locally defined by a triplet constituted by the maximum sphere $SPH_{max}$, the minimum sphere $SPH_{min}$ and the cylinder axis $\gamma_{AX}$. Alternatively, the triplet may be constituted by the mean sphere $SPH_{mean}$, the cylinder CYL and the cylinder axis $\gamma_{AX}$.

A "minimum value of curvature", $C_{min}$, is a minimum value of mean curvatures, $CURV_{mean}$, within a given area;

A "maximum value of curvature", $C_{max}$, is a maximum value of mean curvatures, $CURV_{mean}$, within a given area;

A "zone of stabilized optical power" is a zone where the wearer can see clearly in all gaze directions without changing its accommodation. According to an embodiment, an area of stabilized optical power area of stabilized optical power is an area where the requirements of following equation are fulfilled:

$-0.25$ Diopter$\leq Popt(\alpha,\beta)-Popt_{mean}\leq 0.25$ Diopter;

$\alpha$ being the eye declination angle and $\beta$ being the eye azimuth angle, $Popt(\alpha,\beta)$ being the dioptric power in the $\alpha,\beta$ gaze direction and $Popt_{mean}$ being the mean dioptric power over said area, wherein $Popt(\alpha,\beta)$ and $Popt_{mean}$ are expressed in Diopter.

"Micro-markings" also called "alignment reference marking" have been made mandatory on progressive lenses by the harmonized standards ISO 13666:2012 ("Alignment reference marking: permanent markings provided by the manufacturer to establish the horizontal alignment of the lens or lens blank, or to re-establish other reference points") and ISO 8990-2 ("Permanent marking: the lens has to provide at least following permanent markings: alignment reference markings comprising two markings distant from 34 mm one of each other, equidistant from a vertical plane passing through the fitting point or the prism reference point"). Micro-markings that are defined the same way are also usually made on complex surfaces, such as on a front surface of a lens with a front surface comprising a progressive or regressive front surface.

"Temporary markings" may also be applied on at least one of the two surfaces of the lens, indicating positions of control points (reference points) on the lens, such as a control point for far-vision, a control point for near-vision, a prism reference point and a fitting point for instance. The prism reference point PRP is considered here at the midpoint of the straight segment which connects the micro-markings. If the temporary markings are absent or have been erased, it is always possible for a skilled person to position the control points on the lens by using a mounting chart and the permanent micro-markings. Similarly, on a semi-finished lens blank, standard ISO 10322-2 requires micro-markings to be applied. The centre of the aspherical surface of a semi-finished lens blank can therefore be determined as well as a referential as described above.

"inset" is known in the art and may be defined as follows. In a progressive addition lens, the near-vision point (the near-vision point corresponds to the intersection with the gaze direction allowing the wearer to gaze in near-vision, this gaze direction belonging to the meridian line) can be shifted horizontally with respect to a vertical line passing through the distance-vision point, when the lens is in a position of use by its wearer. This shift, which is in the direction of the nasal side of the lens, is referred to as "inset". It generally depends on a number of parameters, such as the optical power of the lens, the distance of observation of an object, the prismatic deviation of the lens and the eye-lens distance, notably. The inset may be an entry parameter selected by an optician at the time of lens order. Inset may be determined by computation or by ray tracing based upon the order data (prescription data).

DETAILED DESCRIPTION OF THE INVENTION

The invention is illustrated by the following non-limiting examples.

In all the figures following references are used:
FVP: far vision point;
FP: fitting point;
PRP: prism reference point;
NVP: near vision point;
MER: meridian line;
FVGD: far vision gaze direction;
NVGD: near vision gaze direction.

EXAMPLE 1

Progressive Lens with a Front Progressive Surface and a Back Progressive Surface According to the Present Invention The lens of Example 1 has both a front progressive surface and a back progressive surface.

The prescribed sphere $SPH_p$ is 0 Diopter.

The prescribed astigmatism value $CYL_p$ is 0 Diopter and a prescribed axis $AXIS_p$ is 0.

The prescribed addition $Add_p$ is 2 Diopter.

Figure 8:
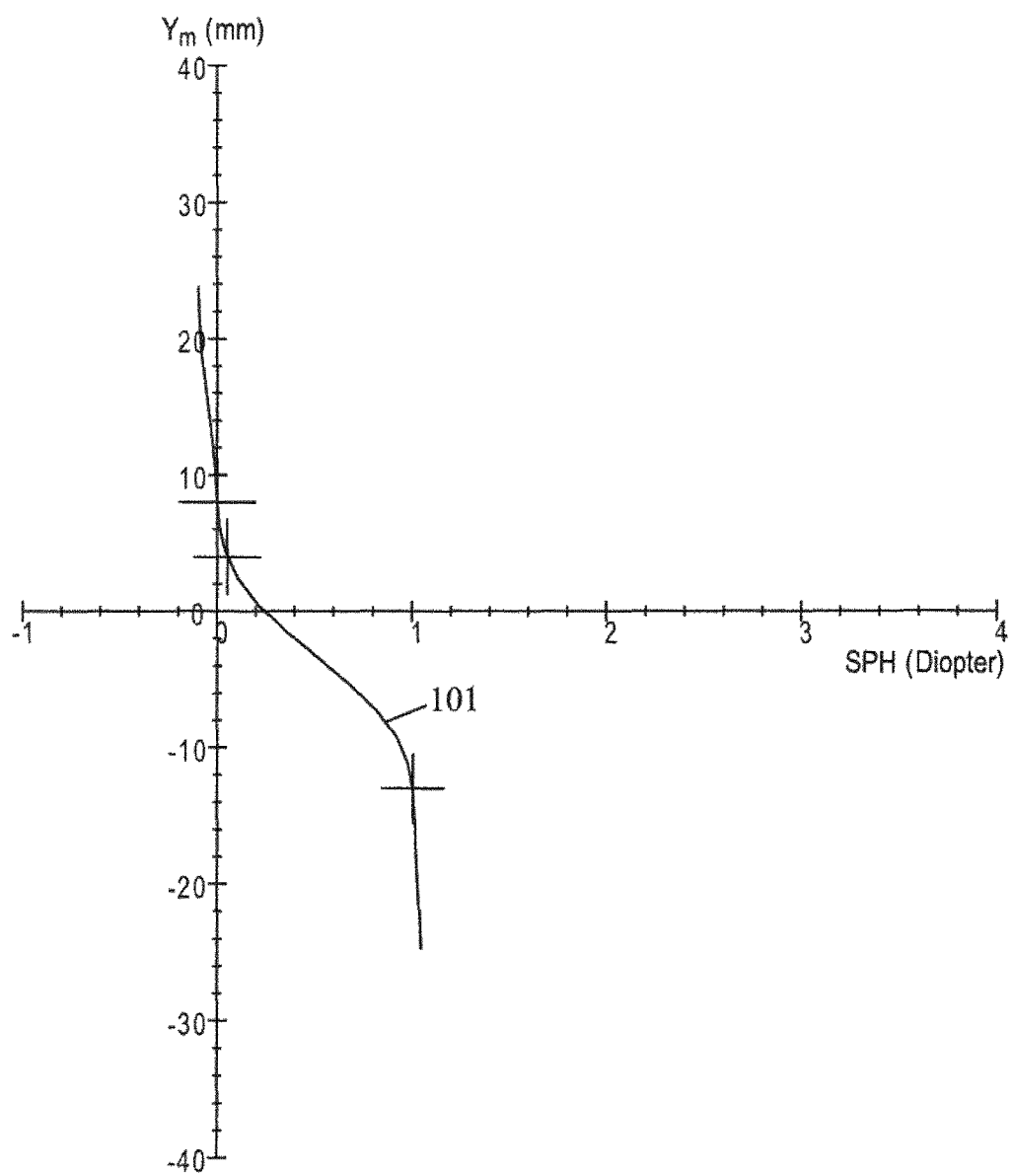
FIGS. 8 to 16 give optical and surface characteristics of an example of a progressive spectacle ophthalmic lens according to the invention.
Figure 9:
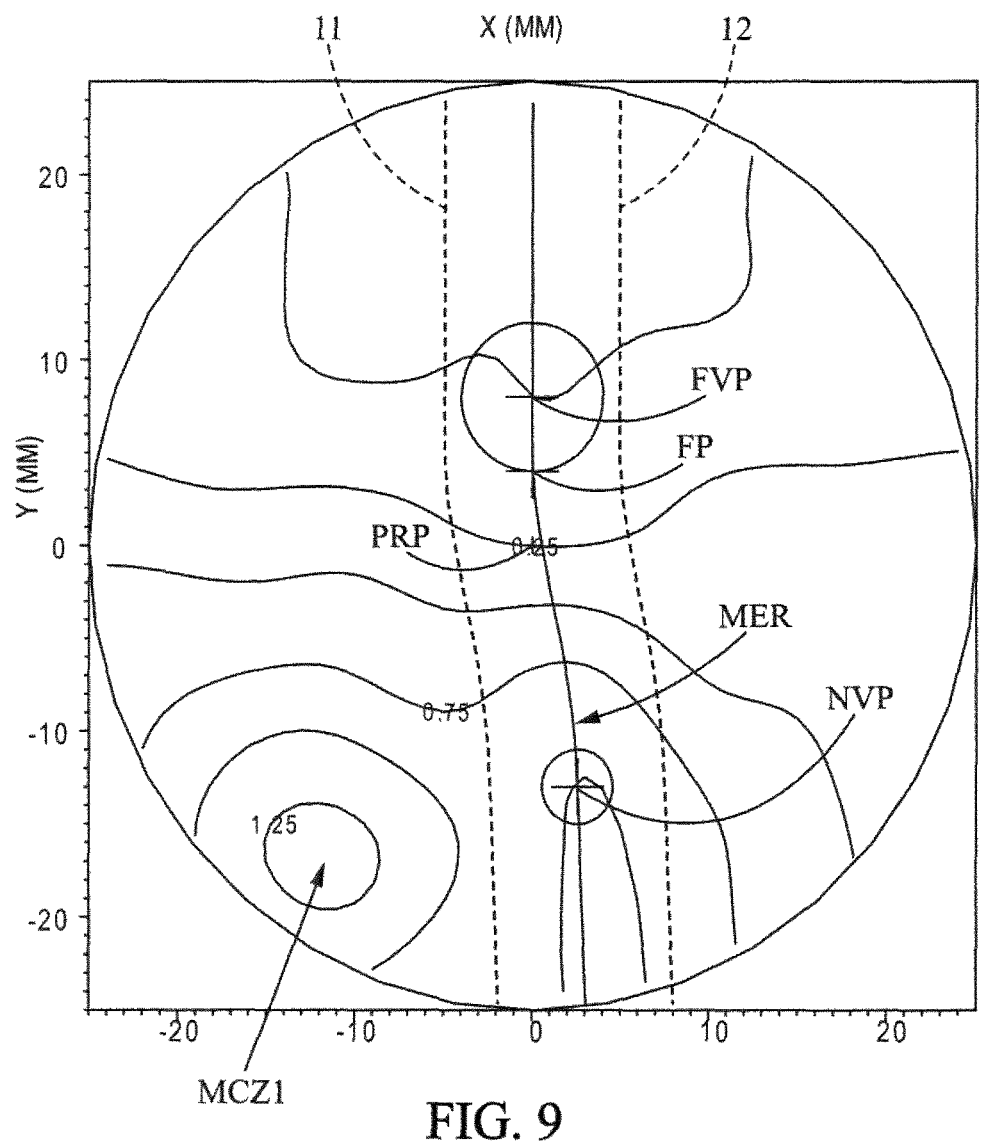
Figure 10:
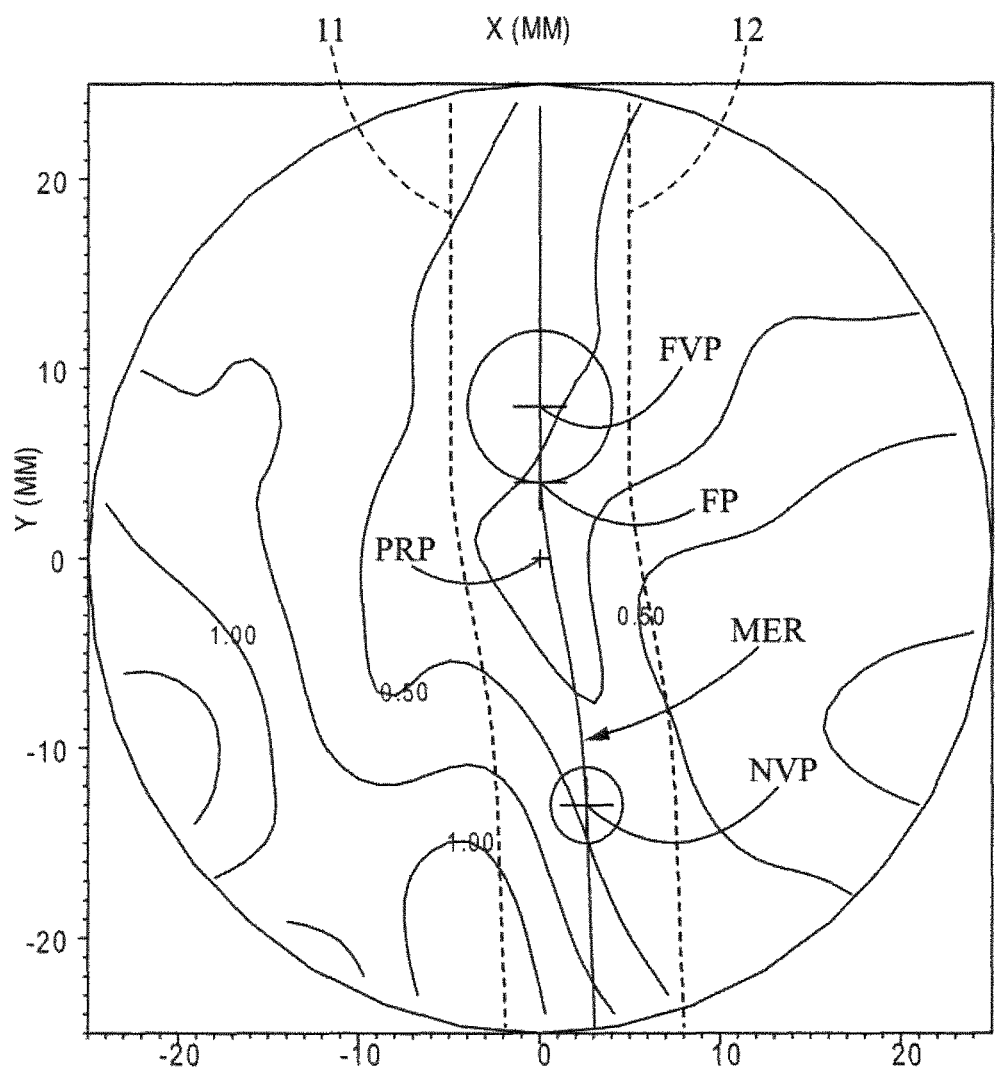
Figure 11:
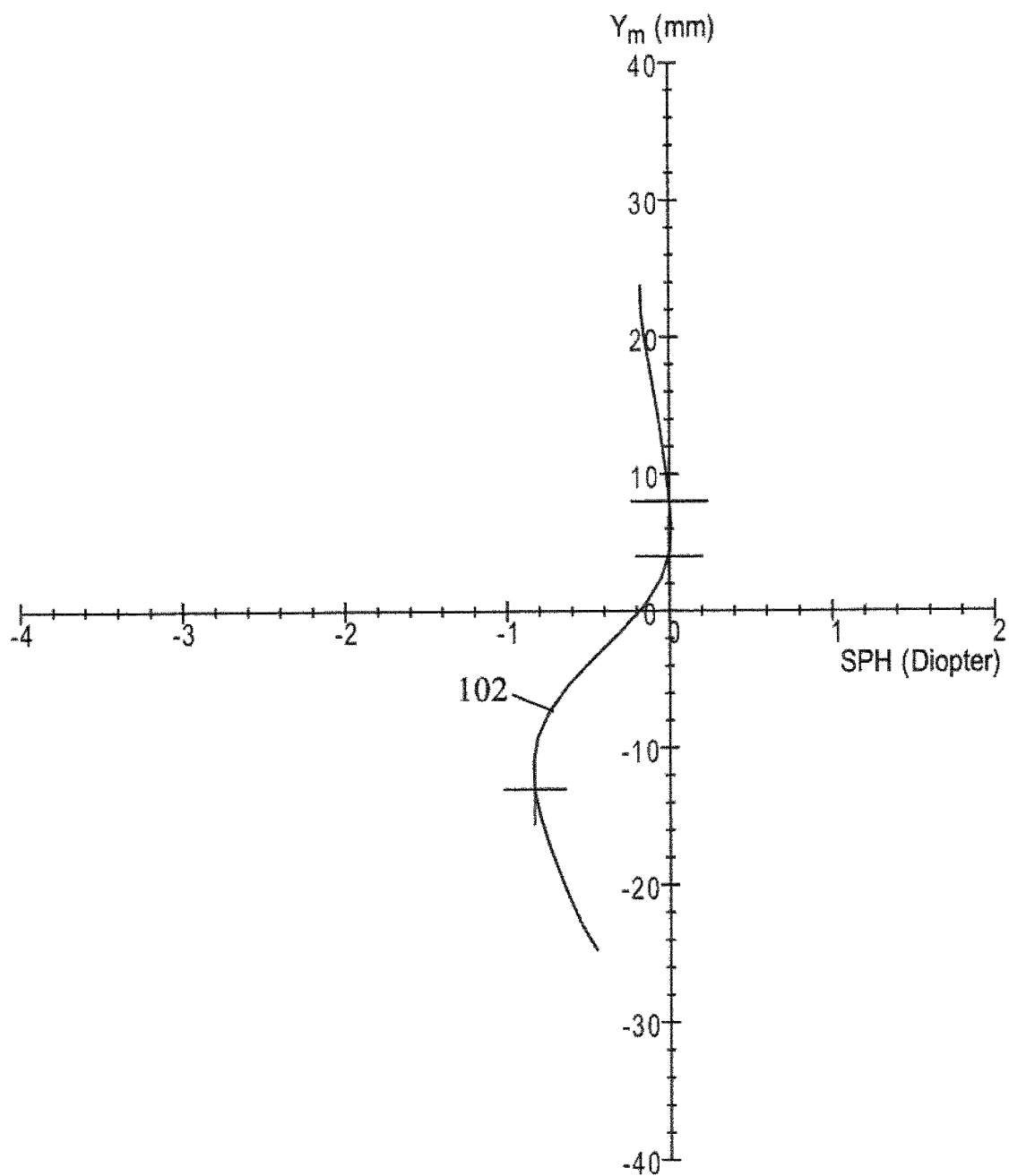
Figure 12:
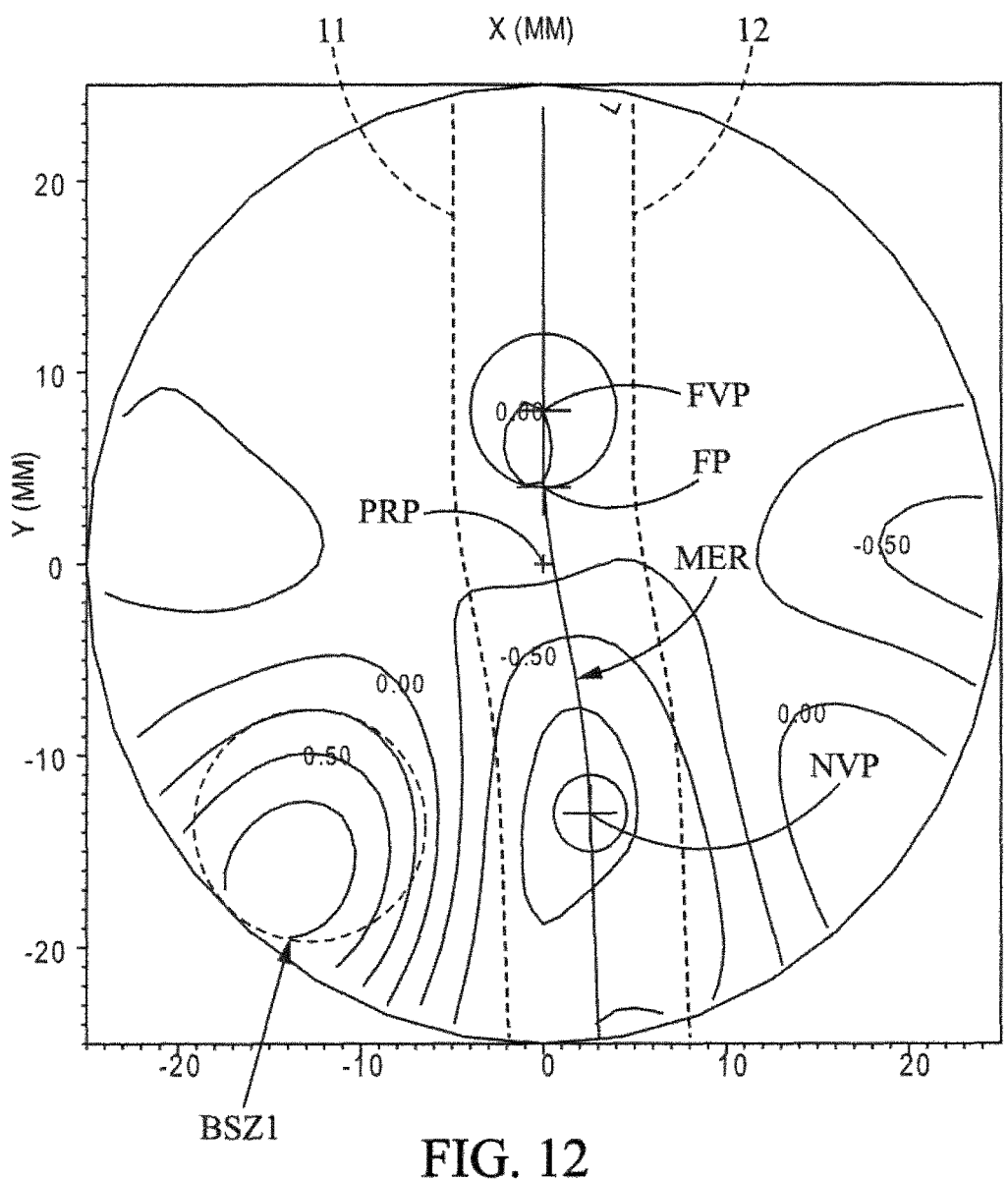
Figure 13:
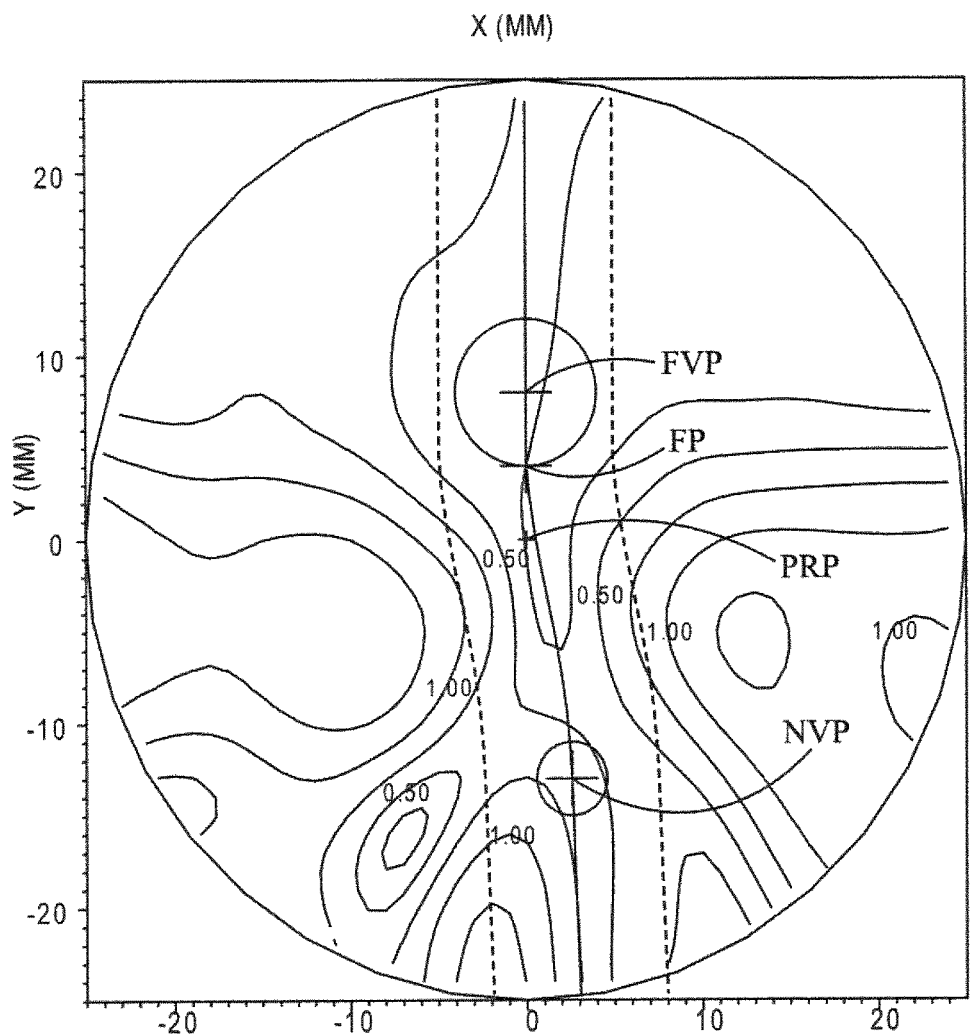
Figure 14:
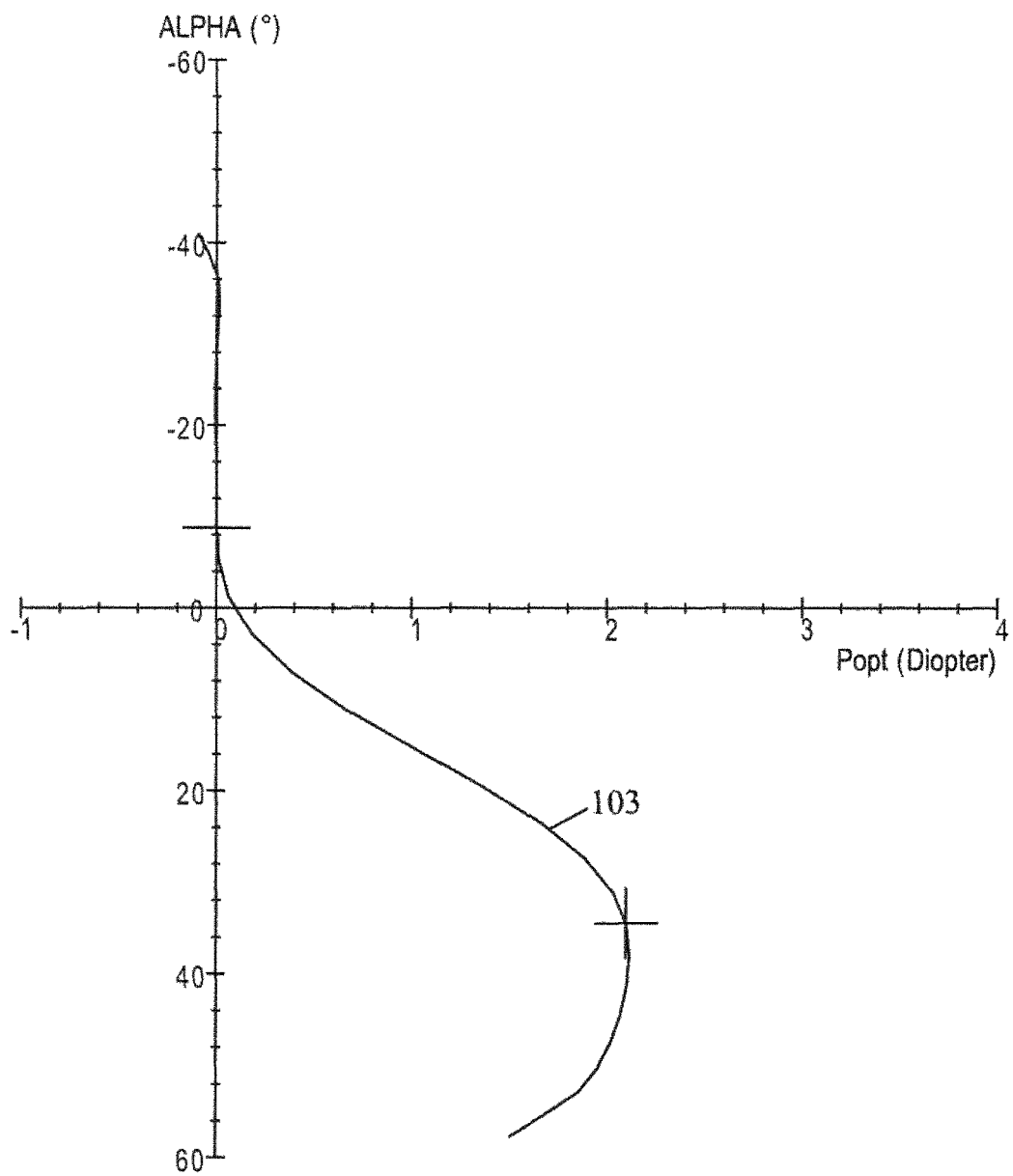
Figure 15:
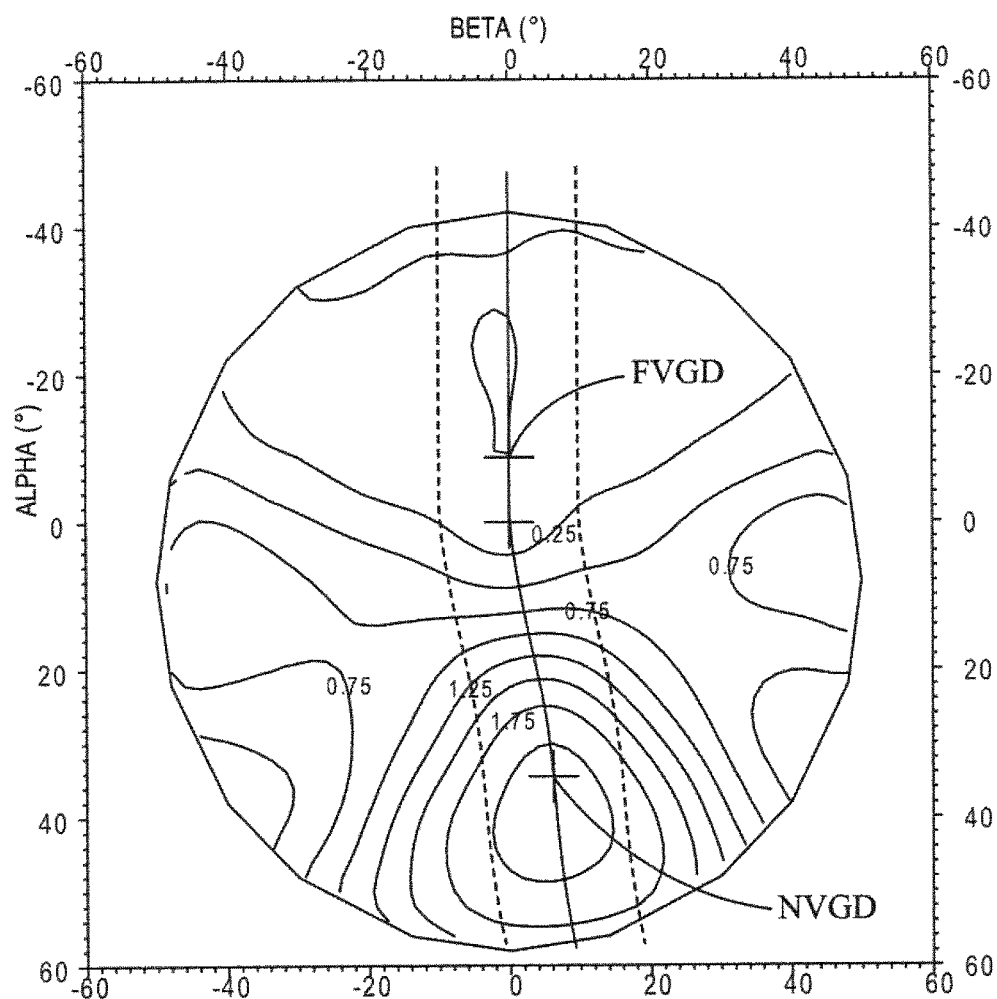
Figure 16:
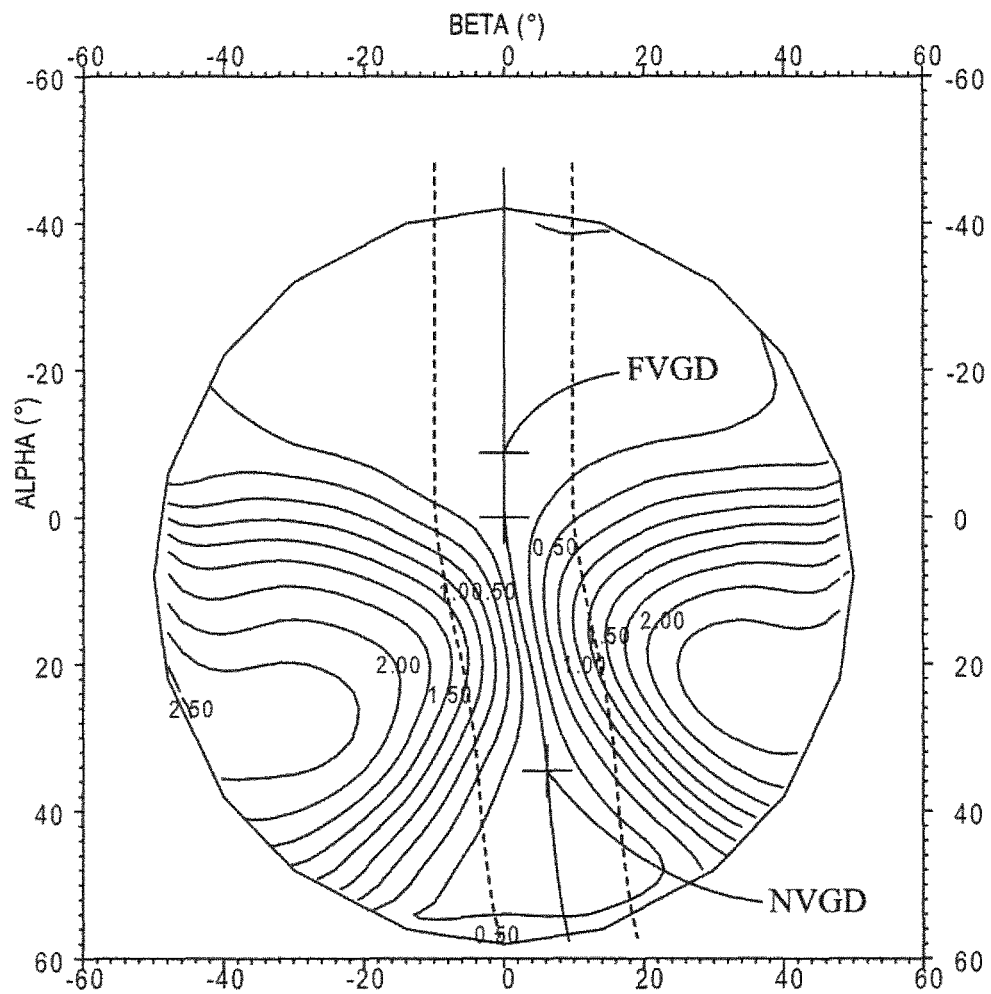

FIGS. 8 to 16 give optical and surface characteristics of the lens of Example of 1;

FIG. 8 shows the mean sphere variation $SPH_{mean}$ ($x_{m\_FS}$, $y_{m\_FS}$), curve 101, along the meridian line ($x_{m\_FS}$, $y_{m\_FS}$) of the front surface of the lens; the axis $y_m$ on the figure refers to a line where $x=x_{m\_FS}$ and $y_{m\_FS}$ varying from top to down according to the (x,y) referential of the front surface;

FIG. 9 shows the mean sphere iso-lines (0.25 Diopter between two neighbouring lines) on the front surface of the lens, according to the (x,y) referential of the front surface;

FIG. 10 shows the cylinder iso-lines (0.25 Diopter between two neighbouring lines) on the front surface of the lens, according to the (x,y) referential of the front surface;

FIG. 11 shows the mean sphere variation $SPH_{mean}$ ($x_{m\_BS}$, $y_{m\_BS}$), curve 102, along the meridian line ($x_{m\_BS}$, $y_{m\_BS}$) of the back surface of the lens; the axis $y_m$ on the figure refers to a line where $x=x_{m\_BS}$ and $y_{m\_BS}$ varying from top to down according to the (x,y) referential of the back surface;

FIG. 12 shows the mean sphere iso-lines (0.25 Diopter between two neighbouring lines) on the back surface of the lens, according to the (x,y) referential of the back surface;

FIG. 13 shows the cylinder iso-lines (0.25 Diopter between two neighbouring lines) on the back surface of the lens, according to the (x,y) referential of the back surface;

FIG. 14 shows the optical power variation $Popt(\alpha_m, \beta_m)$, curve 103, along the meridian line of the front surface of the lens;

FIG. 15 shows the optical power $Popt(\alpha, \beta)$ iso-lines (0.25 Diopter between two neighbouring lines) on the front surface of the lens, according to the $(\alpha,\beta)$ referential of the lens;

FIG. 16 shows the resulting astigmatism iso-lines (0.25 Diopter between two neighbouring lines) on the front surface of the lens, according to the $(\alpha,\beta)$ referential of the lens.

The lens of Example 1 comprises two progressive surfaces (see FIGS. 8 to 13), each contributing to the addition for the wearer.

When considering the meridian line, the right part of the (x,y) figures or of the (α, β) figures corresponds to the nasal zone, where the left one corresponds to the temporal zone.

Dotted lines 11 and 12 are plotted at a 5 mm distance (line 11 at −5 mm and line 12 at +5 mm) from the meridian surface line.

The front surface comprises a magnification zone MCZ1 that provides a magnifying function in the temporal lateral zone of the lens.

The front surface has following features:

The mean sphere value at the far vision point FV of the front surface is $SPH_{FV}$ equal to 3.7 Diopter.

The front meridian of the front surface line has a minimum value of curvature $C_{1mermin}$ equal to 7.3 m$^{-1}$.

The front meridian line of the front surface has a maximum value of curvature $C1_{mermax}$ equal to 9.6 m$^{-1}$.

The progressive front surface comprises a point $P_{11}$ in the magnification zone MCZ1, situated at (x,y)=(−12 mm,−17 mm) according to the (x,y) referential of the front surface, having a maximum value of curvature $C_{11max}$, where $C_{11max}$ is equal to 10.1 Diopter.

The distance between $P_{11}$ and the front meridian line is equal to 14.5 mm, thus greater than 5 mm.

Zone BSZ1 of the back surface substantially compensates dioptric effects of the magnifying function of the progressive front surface.

The lens of Example 1 thus provides a magnifying function in the temporal lateral zone of the lens and provides enhanced visual comfort to a wearer who needs additional magnification in the temporal lateral.

EXAMPLE 2

Progressive Lens with a Front Regressive Surface and a Back Progressive Surface According to the Present Invention The lens of Example 2 has a front regressive surface and a back progressive surface. The prescribed sphere $SPH_p$ is 1 Diopter.

The prescribed astigmatism value $CYL_p$ is 0 Diopter and a prescribed axis $AXIS_p$ is 0. The prescribed addition $Add_p$ is 2 Diopter.

Figure 17:
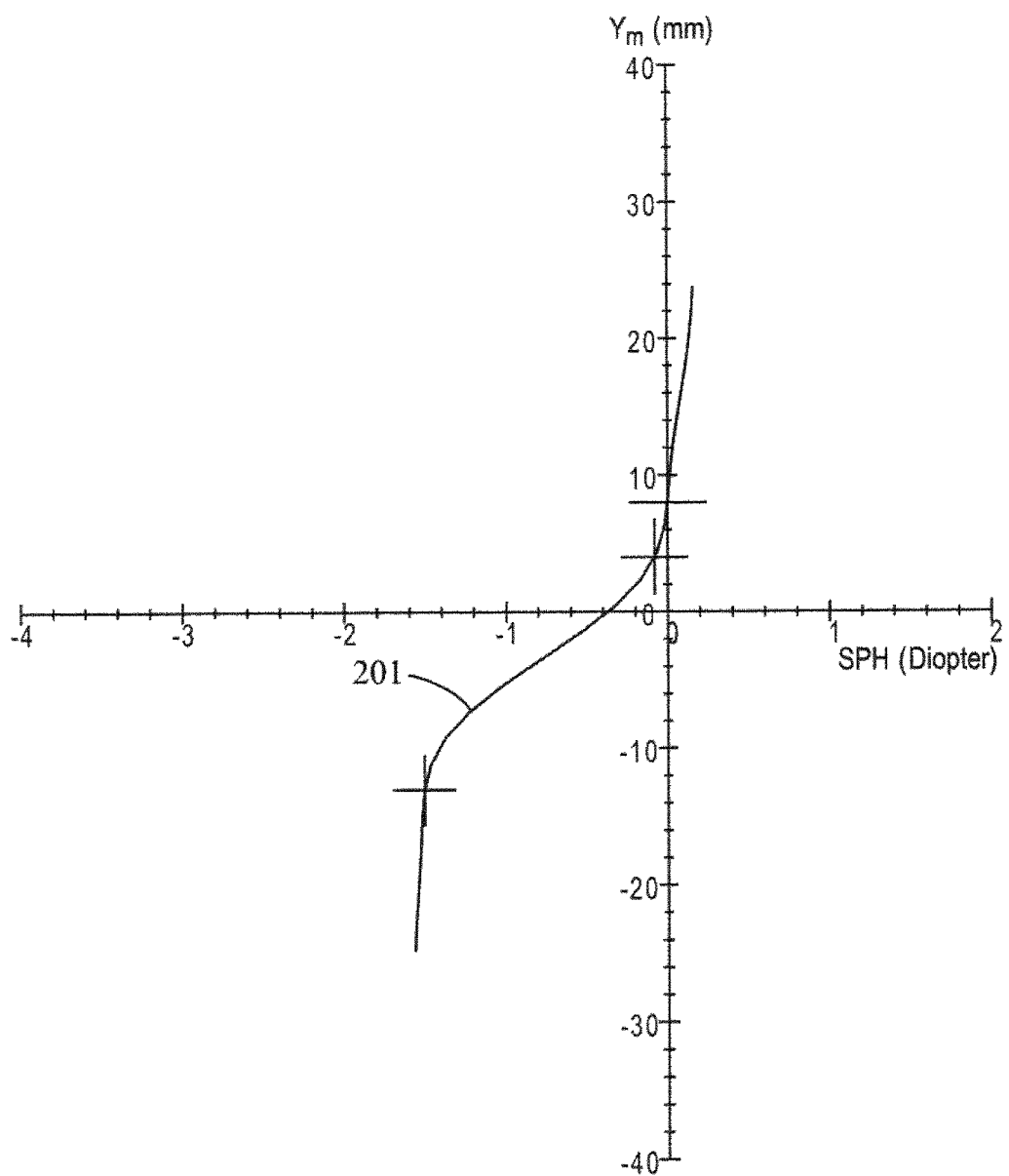
FIGS. 17 to 25 give optical and surface characteristics of another example of a progressive spectacle ophthalmic lens according to the invention.
Figure 18:
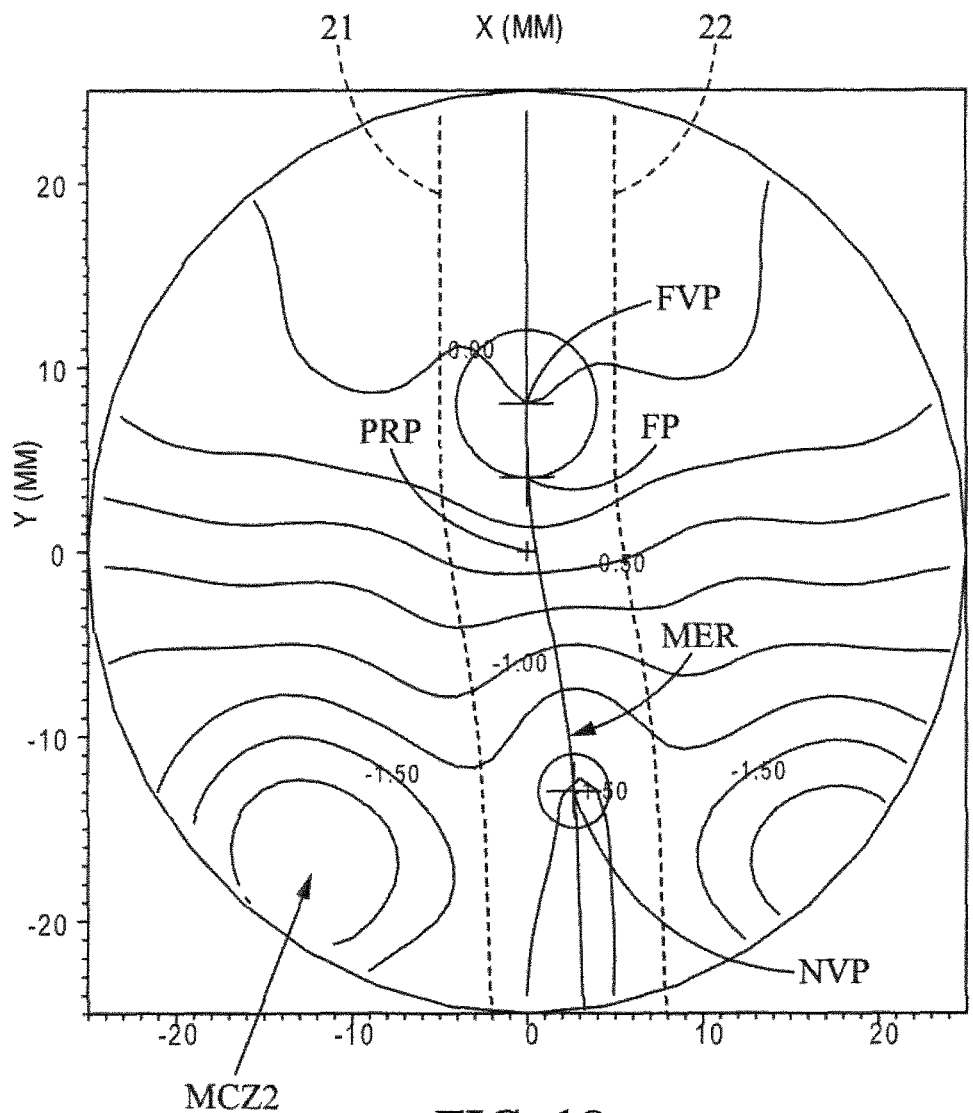
Figure 19:
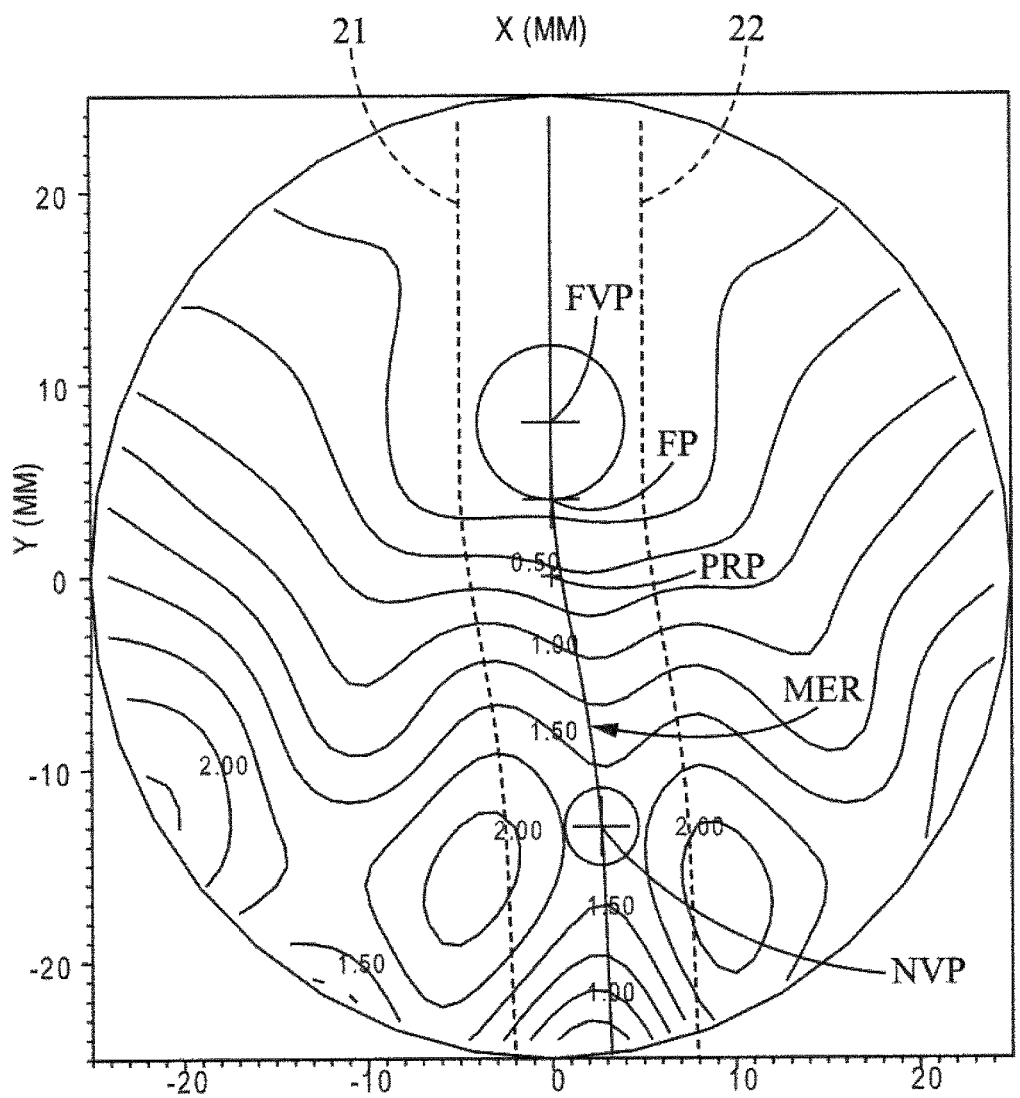
Figure 20:
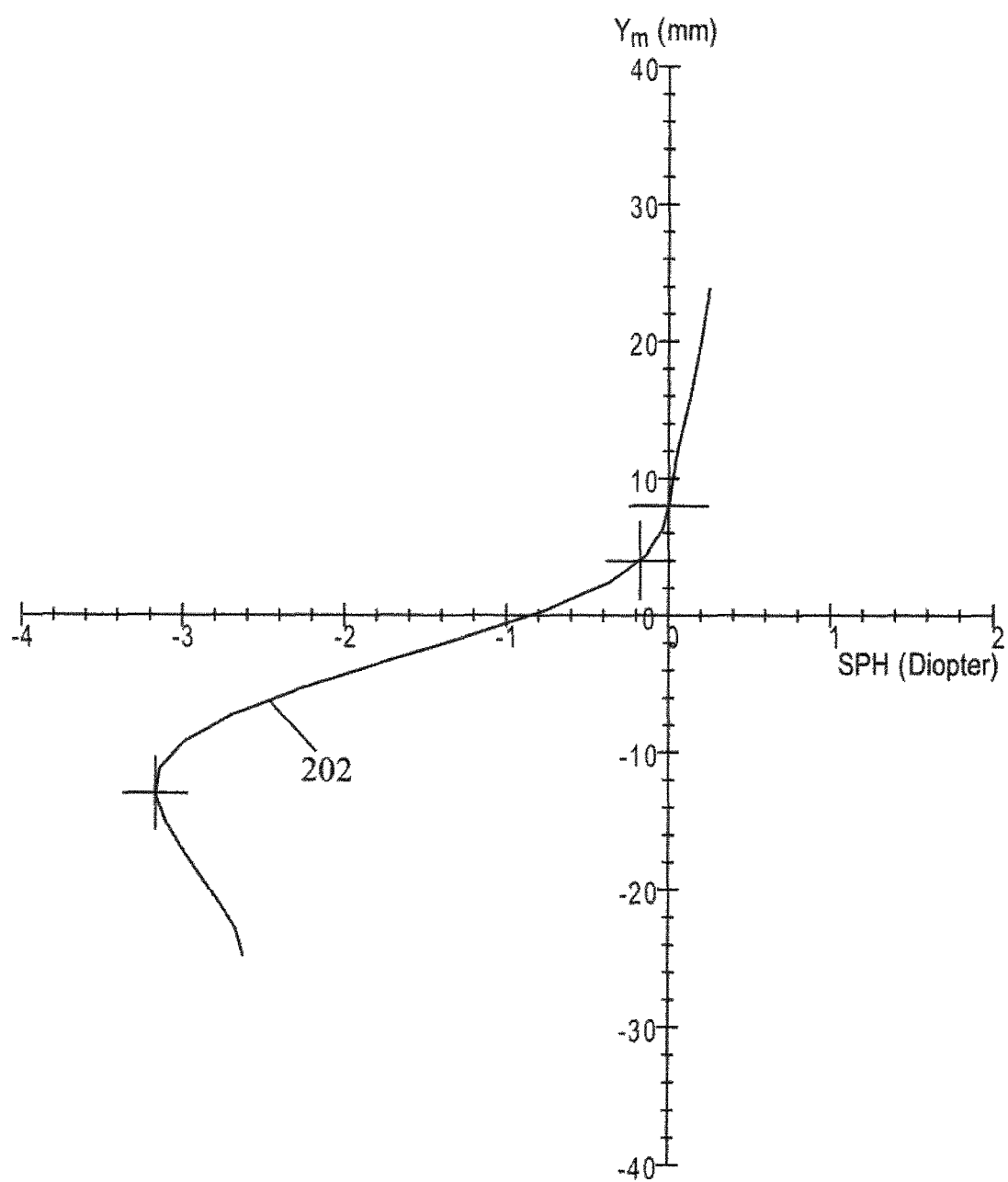
Figure 21:
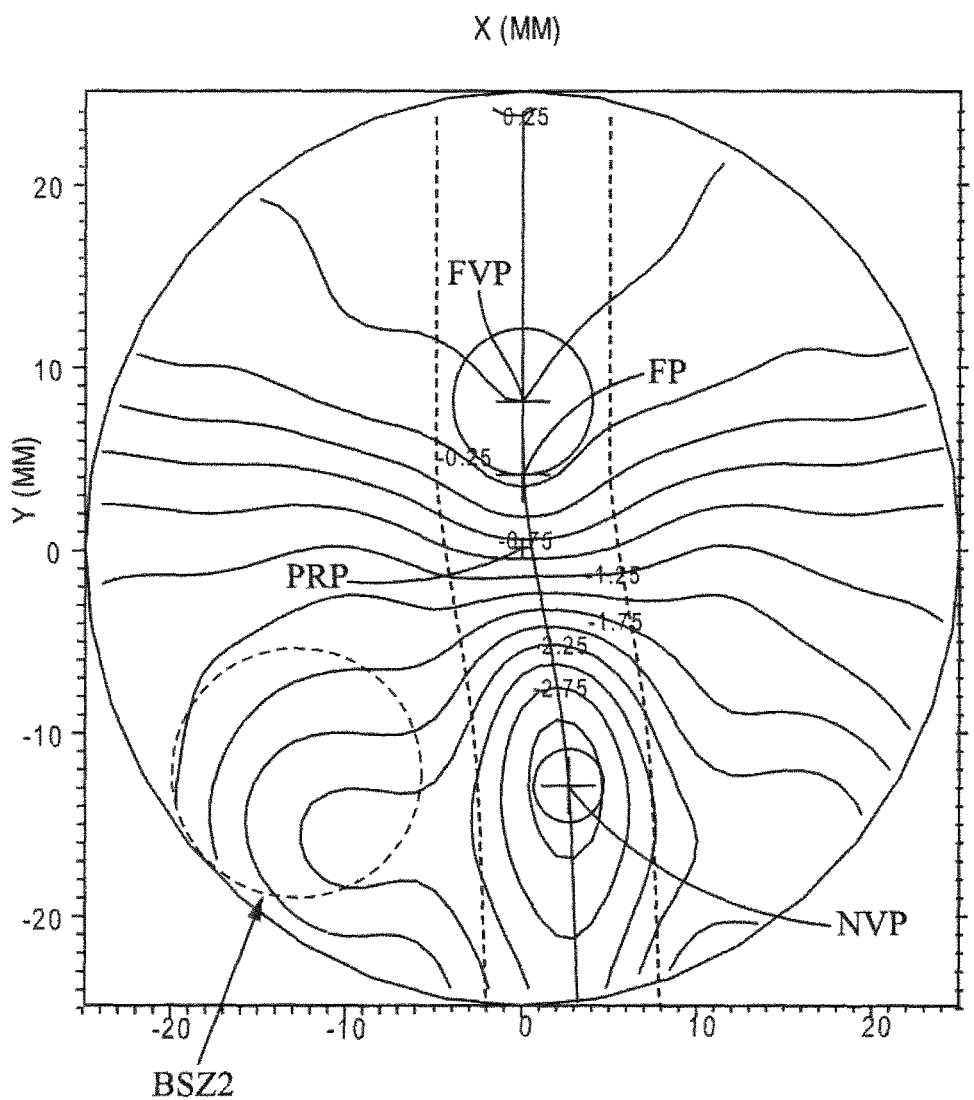
Figure 22:
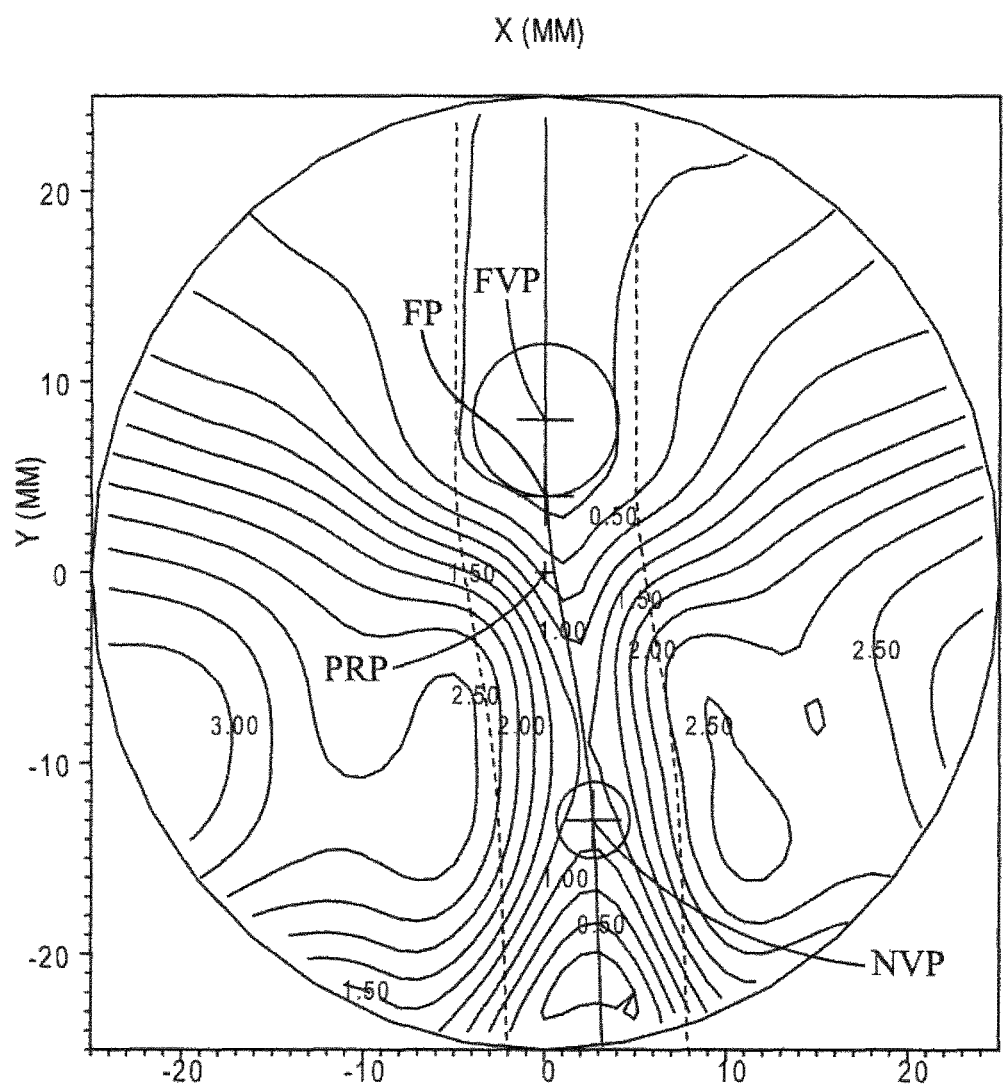
Figure 23:
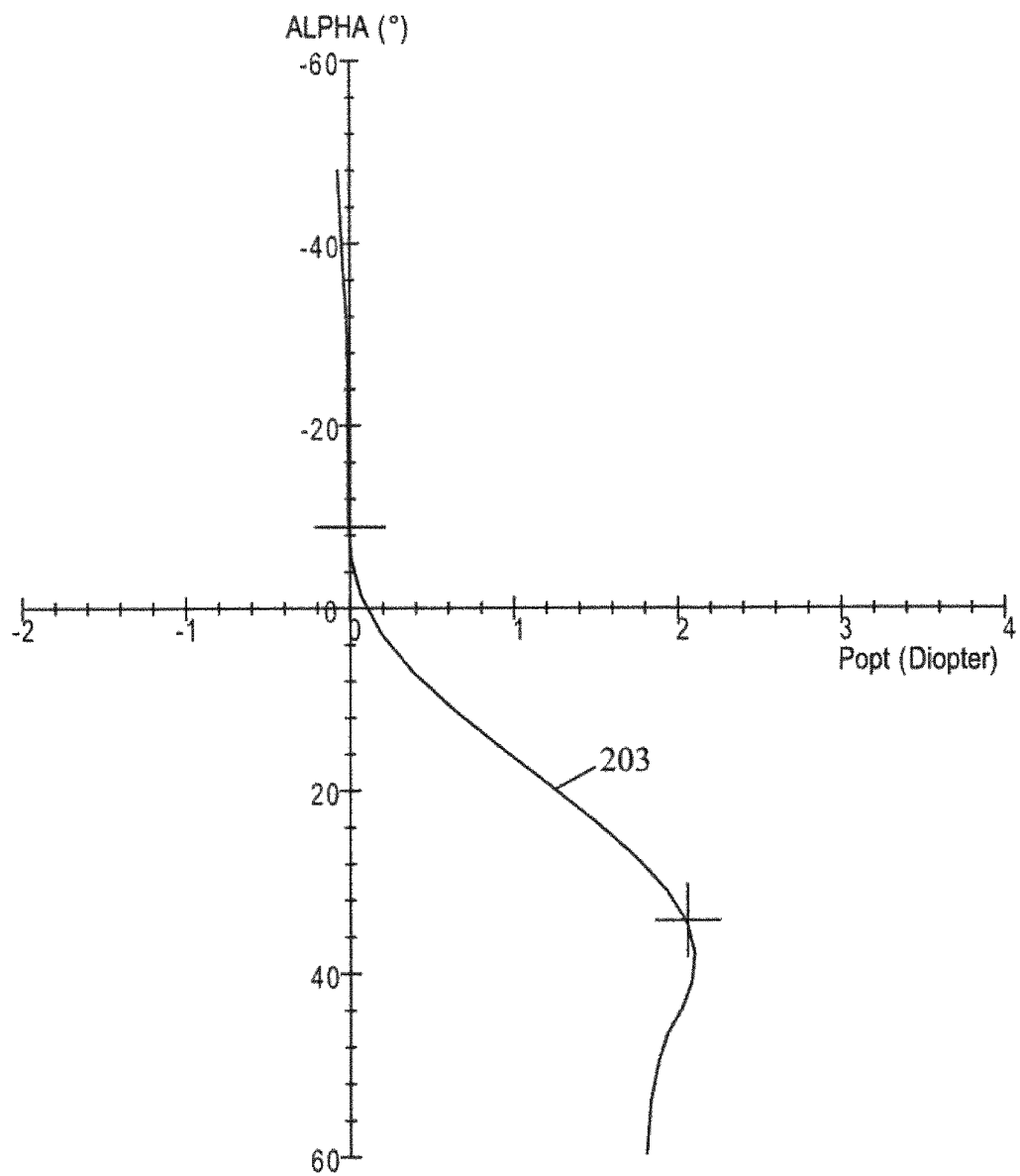

FIGS. 17 to 25 give optical and surface characteristics of the lens of Example of 2;

FIG. 17 shows the mean sphere variation, $SPH_{mean}$ ($x_{m\_FS}$, $y_{m\_FS}$), curve 201, along the meridian line ($x_{m\_FS}$, $y_{m\_FS}$) of the front surface of the lens;

FIG. 18 shows the mean sphere iso-lines (0.25 Diopter between two neighbouring lines) on the front surface of the lens, according to the (x,y) referential of the front surface; the axis $y_m$ on the figure refers to a line where $x=x_{m\_FS}$ and $y_{m\_FS}$ varying from top to down according to the (x,y) referential of the front surface;

FIG. 19 shows the cylinder iso-lines (0.25 Diopter between two neighbouring lines) on the front surface of the lens, according to the (x,y) referential of the front surface;

FIG. 20 shows the mean sphere variation $SPH_{mean}$ ($x_{m\_BS}$, $y_{m\_BS}$), curve 202, along the meridian line ($x_{m\_BS}$, $y_{m\_BS}$) of the back surface of the lens; the axis $y_m$ on the figure refers to a line where $x=x_{m\_BS}$ and $y_{m\_BS}$ varying from top to down according to the (x,y) referential of the back surface;

FIG. 21 shows the mean sphere iso-lines (0.25 Diopter between two neighbouring lines) on the back surface of the lens, according to the (x,y) referential of the back surface;

FIG. 22 shows the cylinder iso-lines (0.25 Diopter between two neighbouring lines) on the back surface of the lens, according to the (x,y) referential of the back surface;

FIG. 23 shows the optical power variation Popt($α_m$, $β_m$), curve 203, along the meridian line of the front surface of the lens.

Figure 24:
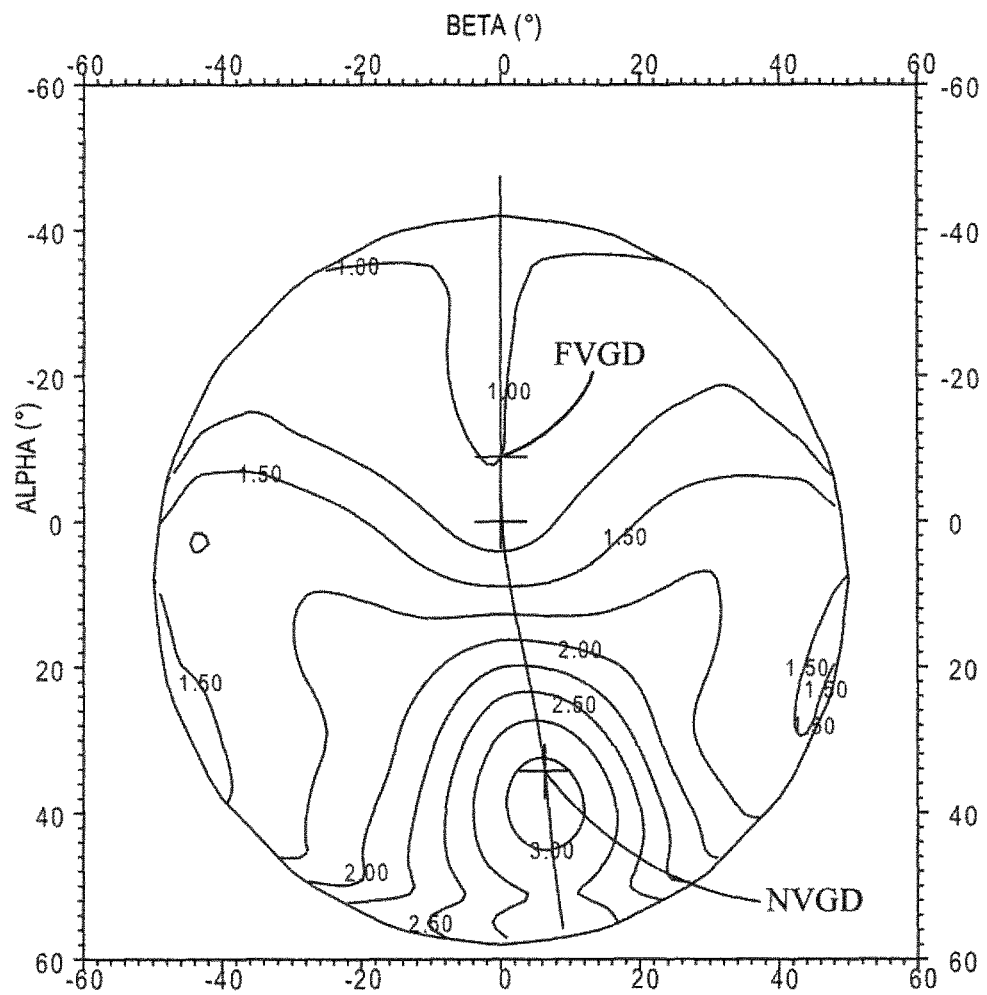
Figure 25:
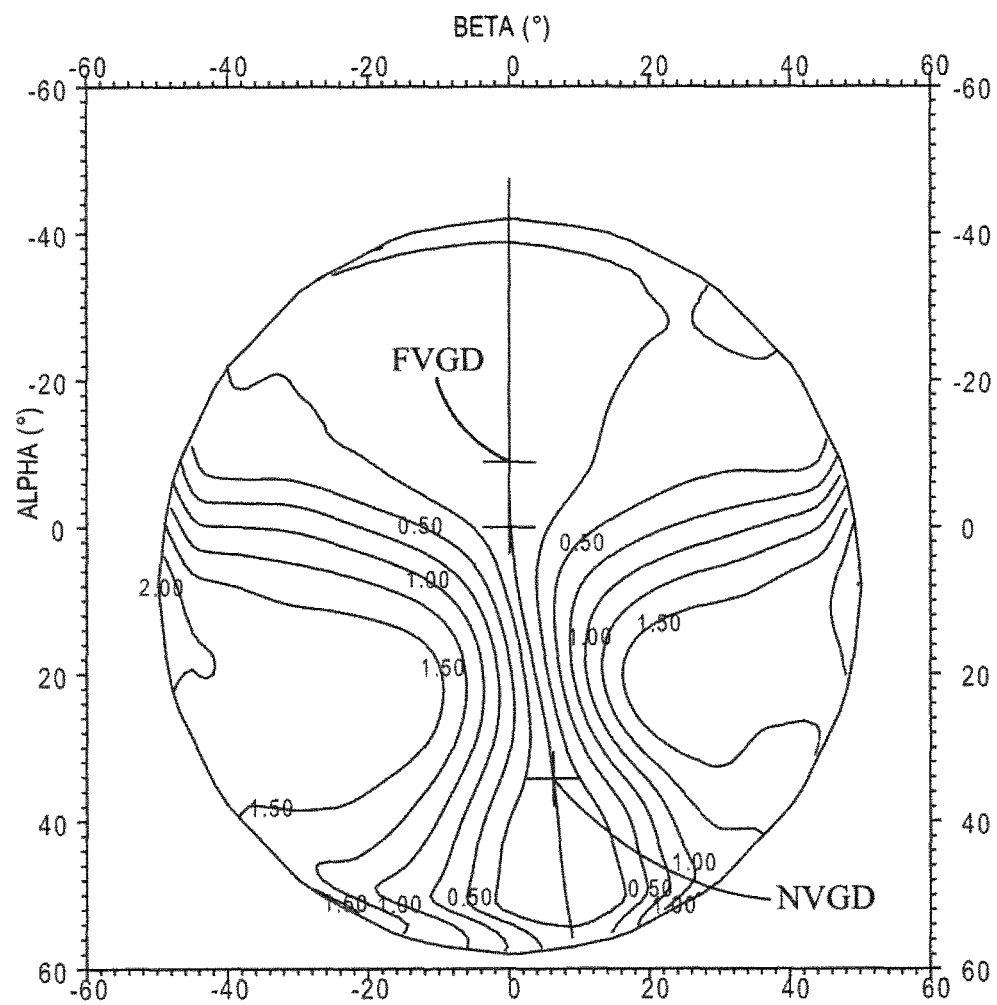

FIG. 24 shows the optical power Popt(α, β) iso-lines (0.25 Diopter between two neighbouring lines) on the front surface of the lens, according to the (α,β) referential of the lens;

FIG. 25 shows the resulting astigmatism iso-lines (0.25 Diopter between two neighbouring lines) on the front surface of the lens, according to the (α,β) referential of the lens.

Said figures are shown as differential figures compared to a nil far vision mean refractive power. Accordingly and in the present embodiment, one has to add one Diopter to obtain the actual mean curvature values and the actual mean optical power values.

The lens of Example 2 comprises a regressive front surface and a progressive back surface (see FIGS. 17 to 22), the combination of them providing the desired addition for the wearer.

When considering the meridian line, the right part of the (x,y) figures or of the (α, β) figures corresponds to the nasal zone, where the left one corresponds to the temporal zone.

Dotted lines 21 and 22 are plotted at a 5 mm distance (line 21 at −5 mm and line 22 at +5 mm) from the meridian surface line.

The front surface comprises a magnification zone MCZ2 that provides a magnifying function in the temporal lateral zone of the lens.

The front surface has following features:

The mean sphere value at the far vision point FV of the front surface is $SPH_{FV}$ equal to 3.8 Diopter.

The front meridian of the front surface line has a minimum value of curvature $C_{1mermin}$ equal to 3.3 m$^{-1}$.

The front meridian line of the front surface has a maximum value of curvature $C1_{mermax}$ equal to 5.9 m$^{-1}$.

The progressive front surface comprises a point $P_{11}$ in the magnification zone MCZ2, situated at (x,y)=(−12 mm,−17 mm) according to the (x,y) referential of the front surface, having a minimum value of curvature $C_{11min}$, where $C_{11min}$ is equal to 2.7 m$^{-1}$.

The distance between $P_{11}$ and the front meridian line is equal to 15 mm, thus greater than 5 mm.

The progressive front surface also comprises a point $P_{12}$ on the nasal side, situated at (x,y)=(17 mm,−16 mm) according to the (x,y) referential of the front surface, having a minimum value of curvature $C_{12min}$, where $C_{12min}$ is equal to 2.8 m$^{-1}$.

The distance between $P_{11}$ and the front meridian line is equal to 14 mm, thus greater than 5 mm.

Zone BSZ2 of the back surface substantially compensates dioptric effects of the magnifying function of the progressive front surface.

The lens of Example 2 thus provides a magnifying function in the temporal lateral zone and in the nasal lateral zone of the lens and provides enhanced visual comfort have to a wearer who is sensitive to distortions in peripheral dynamic vision.

The invention claimed is:

1. A spectacle ophthalmic lens, configured to correct vision of a wearer according to a wearer's prescription, comprising:
a front surface and a back surface, wherein the back surface is positioned on a side of the lens closest to a wearer's eye and the front surface is positioned on an opposite side of the lens when the spectacle ophthalmic lens is worn by the wearer; and a nasal lateral zone and a temporal lateral zone, wherein the front surface comprises a progressive or regressive front surface which provides at least a magnifying function in the nasal and/or the temporal lateral zone of the lens, wherein the back surface substantially compensates dioptric effects of the magnifying function of the progressive or regressive front surface, wherein the spectacle ophthalmic lens is chosen within a single vision lens and a progressive multifocal lens, wherein the magnifying function dioptric effects results from following features when the spectacle ophthalmic lens is worn in standard wearing conditions:

if the spectacle ophthalmic lens is a single vision lens:
  the spectacle ophthalmic lens has a fitting point and is associated with data that can define a top to bottom axis ($\beta=0$) of the spectacle ophthalmic lens,
  the dioptric power variation over the whole lens is equal or less than 0.5 Diopter, and
  the progressive or regressive front surface comprises at least a curvature extreme value located in the nasal/ or the temporal zone of the lens, and if the spectacle ophthalmic lens is a progressive multifocal lens:
  the spectacle ophthalmic lens has a fitting point and is associated with data that can define a top to bottom axis ($\beta=0$) of the spectacle ophthalmic lens,
  the spectacle ophthalmic lens has a meridian line ($\alpha_m, \beta_m$),
  optical power extremes are located in a gaze direction zone between ($\alpha_m, \beta_m-10°$) and ($\alpha_m, \beta_m+10°$), and
  the progressive or regressive front surface comprises at least a curvature extreme value located in the nasal/ or the temporal zone of the lens, wherein the spectacle ophthalmic lens has a main line of sight defining a front meridian line on the progressive or regressive front surface, wherein the front meridian line has a minimum value of curvature $C_{1mermin}$ and a maximum value of curvature $C_{1mermax}$, and wherein the progressive or regressive front surface comprises a first point $P_{11}$ having a minimum value of curvature $C_{11min}$ and a maximum value of curvature $C_{11max}$, where $C_{11max} > C_{1mermax}$ or $C_{11min} < C_{1mermin}$, and wherein a distance between $P_{11}$ and the front meridian line is greater than 5 mm.

2. The spectacle ophthalmic lens according to claim 1, wherein $(n-1) \times |C_{11max} - C1_{mermax}| \geq 0.25$ Diopter or $(n-1) \times |C_{11min} - C_{1mermin}| \geq 0.25$ Diopter, where n is the refractive index of the lens.

3. The spectacle ophthalmic lens according to claim 1, wherein $(n-1) \times (C1_{mermax} - C1_{mermin}) \geq 0.25$ Diopter, preferably $\geq 0.5$ Diopter, where n is the refractive index of the lens.

4. The spectacle ophthalmic lens according to claim 1, wherein the progressive or regressive front surface fulfills requirements of one of conditions of (1)-(3):

(1) the progressive or regressive front surface comprises a second point $P_{12}$, different from point $P_{11}$, having a minimum value of curvature $C_{12min}$ and a maximum value of curvature $C_{12max}$, where $C_{12max} > C_{1mermax}$ or $C_{12min} < C_{1mermin}$, and wherein a distance between $P_{12}$ and the front meridian line is greater than 5 mm, (2) the front surface is a progressive surface and $C_{11max} > C_{1mermax}$, and (3) the front surface is a regressive surface and $C_{11min} < C_{1mermin}$.

5. The spectacle ophthalmic lens according to claim 4, wherein the progressive or regressive front surface comprises a second point $P_{12}$ having a minimum value of curvature $C_{12min}$ and a maximum value of curvature $C_{12max}$, where $C_{12max} > C_{1mermax}$ or $C_{12min} < C_{1mermin}$, wherein the distance between $P_{12}$ and the front meridian line is greater than 5 mm, and wherein both points $P_{11}$ and $P_{12}$ are located either in the nasal lateral zone or in the lateral zone.

6. The spectacle ophthalmic lens according to claim 4, wherein the main line of sight defines a back meridian line on the back main surface, wherein the back meridian line has a minimum value of curvature $C_{2mermin}$ and a maximum value of curvature $C_{2mermax}$, wherein the back main surface comprises a third point $P_{23}$ having a minimum value of curvature $C_{23min}$ and a maximum value of curvature $C_{23max}$ where $C_{23max} > C_{2mermax}$ or $C_{23min} < C_{2mermin}$, and wherein a distance between $P_{23}$ and the back meridian line is greater than 5 mm.

7. The spectacle ophthalmic lens according to claim 1, wherein the spectacle ophthalmic lens is a progressive multifocal lens which comprises when worn an intermediate region and a line of sight passing through the first vision region and the intermediate region, the line of sight splitting the lens into a nasal lateral zone and a temporal lateral zone, and wherein the first vision region comprises a zone of stabilized optical power.

8. The spectacle ophthalmic lens according to claim 7, wherein the spectacle ophthalmic lens further comprises a second vision region comprising a zone of stabilized optical power, and wherein the intermediate region joins the first vision region and the second vision region.

9. The spectacle ophthalmic lens according to claim 1, the spectacle ophthalmic lens having a main line of sight, the main line of sight defining a front meridian line on the front surface and a back meridian line on the back surface, wherein the front surface is asymmetrical regarding the front meridian line and the back surface is asymmetrical regarding the back meridian line, and wherein the dioptric function is symmetrical regarding the main line of sight.

10. The spectacle ophthalmic lens according to claim 9, wherein:

each couple of points located on the first main surface at a given height and equidistant from the meridian line satisfies $MAX(|SPH_N - SPH_T|) \geq 0.25$ Diopter, as equal or greater to 0.5 Diopter, each couple of gaze directions equidistant from the main line of sight and located at a same elevation, satisfies $MAX(|Popt_N - Popt_T|) \leq k \cdot MAX(|SPH_N - SPH_T|)$, wherein $k \leq 0.8$, and wherein SPH is the mean sphere value in a zone, Popt is the optical power value in a zone, index N relates to the nasal lateral zone and index T relates to the temporal lateral zone, and MAX( ) is the maximum value of the quantity evaluated over an evaluation domain.

11. The spectacle ophthalmic lens according to claim 1, the spectacle ophthalmic lens having a main line of sight, the main line of sight defining a front meridian line on the front surface and a back meridian line on the back surface wherein, the front surface is asymmetrical regarding the front meridian line and the back surface is asymmetrical regarding the back meridian line, and wherein the dioptric function is symmetrical regarding the main line of sight.

12. The spectacle ophthalmic lens according to claim 11, wherein:

each couple of points located on the first main surface at a given height and equidistant from the meridian line satisfies $MAX(|SPH_N-SPH_T|) \geq 0.25$ Diopter, as equal or greater to 0.5 Diopter, each couple of gaze directions equidistant from the main line of sight and located at a same elevation, satisfies $MAX(|Popt_N-Popt_T|) \leq k \cdot MAX(|SPH_N-SPH_T|)$, wherein $k \leq 0.8$, and wherein SPH is the mean sphere value in a zone, Popt is the optical power value in a zone, index N relates to the nasal lateral zone and index T relates to the temporal lateral zone, and MAX( ) is the maximum value of the quantity evaluated over an evaluation domain.

13. A method for determining a spectacle ophthalmic lens according to claim 1, comprising:
 a) providing a magnifying function;
 b) providing an initial spectacle lens;
 c) determining a dioptric function of the initial spectacle lens;
 d) defining a target lens having the dioptric function of the initial spectacle lens and a target magnifying function equal to the magnifying function of a); and
 e) determining a final spectacle ophthalmic lens by optimization using the targets of d) as targets for the optimization.

14. The method for determining a spectacle ophthalmic lens according claim 13, wherein the magnifying function provided by a first refractive surface is individually optimized based on wearer parameter.

15. An ophthalmic spectacle lens supply system for providing a spectacle ophthalmic lens comprising:

a first computing unit configured to place an order of a spectacle ophthalmic lens, wherein the first computing unit is located at a lens ordering side and comprises a first outputting interface configured to output order data, and wherein the order data comprises an individual magnifying need;

a second computing unit configured to provide lens data based upon order data, wherein the second computing unit is located at a lens determination side and comprises:

a determining computing unit configured to determine a spectacle ophthalmic lens according to the method of claim 13 to fulfill an individual magnifying need, and a second outputting interface configured to output the lens data, wherein the lens data comprises at least lens blank data and surface data;

a first transmission computing unit configured to transmit the order data from the first computing unit to the second computing unit;

a manufacturing device configured to manufacture the spectacle ophthalmic lens based on the lens data wherein the manufacturing device is located at a lens manufacturing side; and a second transmission computing unit configured to transmit the lens data from the second computing unit to the manufacturing device.

16. An ophthalmic spectacle lens supply system for providing a spectacle ophthalmic lens comprising:

a first computing unit configured to place an order of a spectacle ophthalmic lens, wherein first computing unit is located at a lens ordering side and comprises a first outputting interface configured to output order data, and wherein the order data comprises an individual magnifying need;

a second computing unit configured to provide lens data based upon order data, wherein the second computing unit is located at a lens determination side and comprises:

a determining computing unit configured to determine a spectacle ophthalmic lens according to the method of claim 14 to fulfill an individual magnifying need, and a second outputting interface configured to output the lens data, wherein the lens data comprises at least lens blank data and surface data;

a first transmission computing unit configured to transmit the order data from the first computing unit to the second computing unit;

a manufacturing device configured to manufacture the spectacle ophthalmic lens based on the lens data wherein the manufacturing device is located at a lens manufacturing side; and a second transmission computing unit configured to transmit the lens data from the second computing unit to the manufacturing device.

* * * * *